US012754757B2

(12) United States Patent
Usui et al.

(10) Patent No.: US 12,754,757 B2
(45) Date of Patent: Oct. 6, 2026

(54) ANALYSIS FUNCTION IMPARTING METHOD, ANALYSIS FUNCTION IMPARTING DEVICE, AND ANALYSIS FUNCTION IMPARTING PROGRAM

(71) Applicant: NTT, Inc., Tokyo (JP)

(72) Inventors: Toshinori Usui, Musashino (JP); Tomonori Ikuse, Musashino (JP); Yuhei Kawakoya, Musashino (JP); Makoto Iwamura, Musashino (JP)

(73) Assignee: NTT, Inc., Tokyo (JP)

( * ) Notice: Subject to any disclaimer, the term of this patent is extended or adjusted under 35 U.S.C. 154(b) by 337 days.

(21) Appl. No.: 18/701,946

(22) PCT Filed: Oct. 18, 2021

(86) PCT No.: PCT/JP2021/038502
§ 371 (c)(1),
(2) Date: Apr. 17, 2024

(87) PCT Pub. No.: WO2023/067668
PCT Pub. Date: Apr. 27, 2023

(65) Prior Publication Data

US 2025/0231786 A1 Jul. 17, 2025

(51) Int. Cl.
*G06F 9/455* (2018.01)

(52) U.S. Cl.
CPC .................... *G06F 9/45558* (2013.01); *G06F 2009/45591* (2013.01)

(58) Field of Classification Search
CPC .. G06F 9/3865; G06F 9/3861; G06F 9/45558; G06F 9/321; G06F 9/30058; G06F 11/3466; G06F 2009/45591
See application file for complete search history.

(56) References Cited

U.S. PATENT DOCUMENTS

| | | | | |
|---|---|---|---|---|
| 10,871,980 | B2 * | 12/2020 | Muller | G06F 9/485 |
| 12,020,059 | B2 * | 6/2024 | Busaba | G06F 9/45558 |
| 12,530,454 | B2 * | 1/2026 | Malanov | G06F 21/566 |

OTHER PUBLICATIONS

Saxena et al., "A Symbolic Execution Framework for JavaScript", 2010 IEEE Symposium on Security and Privacy, May 16-19, 2010, pp. 513-528.

(Continued)

*Primary Examiner* — Andy Ho
(74) *Attorney, Agent, or Firm* — XSENSUS LLP

(57) ABSTRACT

An analysis function providing method executed by an analysis function providing device includes first analyzing a virtual machine of a script engine, and acquiring a hook point that is a part where an analysis code is inserted by applying a hook, and a virtual program counter that is a variable indicating an instruction of the virtual machine to be executed next, second analyzing an instruction set architecture that is a system of instructions of the virtual machine and acquiring a branch virtual machine instruction that is a virtual machine instruction that causes branch, and providing an analysis function by applying a hook, to the hook point of the script engine, the hook including processing of, when an exception has occurred, changing a destination pointed by the virtual program counter to a head of a basic block immediately after a basic block in which the exception has occurred.

7 Claims, 29 Drawing Sheets

(56) References Cited

OTHER PUBLICATIONS

Kim et al., "J-Force: Forced Execution on JavaScript", 2017 International World Wide Web Conference Committee (IW3C2), Apr. 3-7, 2017, pp. 897-906.
Bucur et al., "Prototyping Symbolic Execution Engines for Interpreted Languages", School of Computer and Communication Sciences, Feb. 24, 2014, 108 pages.
Sharif et al., "Automatic Reverse Engineering of Malware Emulators", 2009 30th IEEE Symposium on Security and Privacy, May 17-20, 2009, pp. 94-109.
Usui et al., "Automatically Appending Multi-Path Execution Functionality to Vanilla Script Engines", CSS 2019 Conference, 8 pages including English Abstract.
Kolbitsch et al., "The Power of Procrastination: Detection and Mitigation of Execution-Stalling Malicious Code", CSS'11, Oct. 17-21, 2011, pp. 285-296.

* cited by examiner

Fig. 4

```
a = 0
For N = 0 To 10
   a = a + N
   a = a * N
   a = a - N
Next
```

Fig. 5

```
bool_array = Array(True, False, True, True, False)

a = 0
For Each bool in bool_array
    If bool Then
        a = a + 1
    End If
Next
```

Fig. 6

```
...
trace: branch, type: jmp, src: 0x6d375f2e, dst: 0x6d39022f
trace: branch, type: jmp, src: 0x6d375f36, dst: 0x6d39023b
trace: branch, type: jmp, src: 0x6d361c86, dst: 0x6d39aee0
trace: branch, type: ret, src: 0x6d361c8c, dst: 0x6d375f4c
trace: branch, type: ret, src: 0x6d375f4f, dst: 0x6d375ee1
trace: branch, type: jmp, src: 0x6d375ee3, dst: 0x6d38fb18
trace: branch, type: ret, src: 0x6d38fb1c, dst: 0x6d375cc9
trace: branch, type: jmp, src: 0x6d375ccb, dst: 0x6d39500a
trace: branch, type: jmp, src: 0x6d375cd6, dst: 0x6d39508a
trace: branch, type: call, src: 0x6d375ceb, dst: 0x75e45435
trace: memaccess, type: read, target: 0x7fff0268, value: 0x0
trace: memaccess, type: write, target: 0x7fffc520, value: 0x55553268
trace: memaccess, type: read, target: 0x55554048, value: 0x31
...
```

Fig. 7

```
...
vpc: 0x555c7e40, vmop: 0x32
vpc: 0x555c7e44, vmop: 0x52
vpc: 0x555c7e48, vmop: 0x1f
vpc: 0x555c82a0, vmop: 0x08
vpc: 0x555c82a4, vmop: 0x32
vpc: 0x555c82a8, vmop: 0x06
...
vpc: 0x555c832c, vmop: 0x21
vpc: 0x555c7514, vmop: 0x2a
vpc: 0x555c7518, vmop: 0x06
...
```

Fig. 29

```
Set wmi = GetObject("winmgmts:¥¥.¥root¥cimv2")
Set cpu = wmi.ExecQuery("Select * from Win32_Processor")

If cpu.Item("Win32_Processor.DeviceID='CPU0'").NumberOfCores <= 2 Then
    WScript.Quit
End If
do_malicious()
```

ANALYSIS FUNCTION IMPARTING METHOD, ANALYSIS FUNCTION IMPARTING DEVICE, AND ANALYSIS FUNCTION IMPARTING PROGRAM

CROSS-REFERENCE TO RELATED APPLICATION

This application is a national stage application, pursuant to 35 U.S.C. § 371, of International Patent Application No. PCT/JP2021/038502, filed Oct. 18, 2021, the entire contents of which are incorporated herein by reference.

TECHNICAL FIELD

The present invention relates to an analysis function providing method, an analysis function providing device, and an analysis function providing program.

BACKGROUND ART

As various forms of attack such as spam (malspam) using malware and fileless malware occur, a threat of attack by a script (malicious script) exhibiting malicious behavior becomes apparent.

The malicious script is a script having malicious behavior, and is a program that implements an attack by abusing a function provided by a script engine. In general, an attack is performed using a script engine of a specific application such as a script engine included in an operating system (OS) by default or a viewer of a web browser or a document file.

Although many of these script engines may require user permission, behavior via a system, such as file manipulation, network communication, and process activation, is also feasible. Thus, the attack using the malicious script becomes a threat to the user, similarly to the attack using malware of an execution file.

To take measures against the attack by the malicious script, it is necessary to accurately grasp the behavior of the script. Thus, a technique of analyzing the script to clarify its behavior is desired.

A problem that arises when analyzing malicious scripts is code obfuscation. Many malicious scripts have been subjected to processing of interfering with analysis called obfuscation. Obfuscation intentionally increases complexity of a code, thereby making it difficult to analyze based on superficial information of the code. That is, it interferes with an analysis method called static analysis, which performs analysis with information obtained from the code without executing the script.

In particular, in a case where a part of the code to be executed is dynamically acquired from the outside, the code cannot be obtained without execution, so that the code cannot be statically analyzed. Thus, static analysis is impossible in principle.

On the other hand, a method called dynamic analysis in which a script is executed and its behavior is monitored and thus the behavior is known is not affected by obfuscation as described above. For this reason, in the analysis of the malicious script, a method based on dynamic analysis is mainly used.

In general dynamic analysis, a malicious script is executed in an analysis environment and its behavior is monitored, whereby only behavior of a single execution path executed in the malicious script is obtained. For this reason, there is a problem that behavior of a path that has not been executed in the analysis environment cannot be obtained.

In other words, for a malicious script having a path that is executed only under a specific condition, there is a problem that all behavior cannot be analyzed even by dynamic analysis.

As a case where there is a path that is executed only under a specific condition, for example, there are a case where a subsequent execution path is determined by a command from a command server, and a case where malicious behavior is not exhibited in the analysis environment due to analysis interference.

The former case is a case where the subsequent execution path is not determined if there is no command from the command server and a path having the malicious behavior is not executed. In a case where a malicious script is detected and analyzed, there are many cases where an attacker has already withdrawn and there is no command server, so that the malicious behavior cannot be observed in such a case.

The latter is an analysis interference that a malicious script acquires information about an environment in which the malicious script is being executed and does not exhibit the malicious behavior if the information does not meet the specific condition. For example, in a case where a feature frequently seen in the analysis environment is observed, it is determined that the malicious script is being analyzed, and the feature is used for analysis interference in which execution is interrupted.

FIG. 29 is a diagram illustrating a code piece indicating an example of analysis interference. This code piece has analysis interference in which the number of cores of a central processing unit (CPU) in an environment in which the code piece is being executed is acquired, and if the number of cores is not two or more and eight or less, it is determined that a possibility of the analysis environment is high, and the execution is ended. Otherwise, it is determined that it is not the analysis environment, and malicious behavior is exhibited.

To capture behavior of a path that is executed only under such a specific condition, multipath execution for executing a plurality of execution paths is required.

In the multipath execution, when the execution reaches a conditional branch, an execution state is caused to branch to cause each branching execution state to follow a corresponding execution path of the branch. As a result, both of two execution paths that occur in the conditional branch are executed.

Regarding implementation of multipath execution, for example, Non Patent Literature 1 describes a method of implementing symbolic execution, which is a type of multipath execution, for JavaScript (registered trademark). According to this method, in a conditional branch of a JavaScript script, it is possible to comprehensively follow executable paths and observe behavior.

In addition, Non Patent Literature 2 describes a method of implementing path forcible execution, which is a type of multipath execution, for JavaScript. According to this method, in a conditional branch of a JavaScript script, it is possible to comprehensively follow all paths and observe behavior.

Non Patent Literature 3 describes a method of manually modifying a script engine in advance and then executing the script engine on a binary symbolic execution base to implement symbolic execution through the script engine for a script executed on the script engine. According to this method, if there is a script engine that can be manually modified, it is possible to implement the symbolic execution in any script language in a general-purpose manner, and comprehensively follow executable paths and observe behavior.

Then, Non Patent Literature 4 describes a method of analyzing a virtual machine (VM) often used by malware for obfuscation of a program of the malware. According to this method, the VM is analyzed, whereby information on architecture of the VM can be acquired. Since the VM controls execution of the script in the script engine, the idea of this method can be partially diverted.

In Non Patent Literature 5, a script engine is analyzed, and a code that implements a multipath execution function is added on the basis of obtained information on the architecture, whereby multipath execution of a script is enabled. According to this method, multipath execution can be implemented for various script languages and engines.

CITATION LIST

Non Patent Literature

Non Patent Literature 1: Prateek Saxena, et al, "A Symbolic Execution Framework for JavaScript", 2010 IEEE Symposium on Security and Privacy.

Non Patent Literature 2: Kyungtae Kim, et al, "J-Force: Forced Execution on JavaScript".

Non Patent Literature 3: Stefan Bucur, et al, "Prototyping Symbolic Execution Engines for Interpreted Languages".

Non Patent Literature 4: Monirul Sharif, et al, "Automatic Reverse Engineering of Malware Emulators", 2009 30th IEEE Symposium on Security and Privacy.

Non Patent Literature 5: Toshinori Usui, Kazuki Furukawa, Yuto Otsuki, Tomonori Ikuse, Yuhei Kawakoya, Makoto Iwamura, Jun Miyoshi, Kanta Matsuura, "Automatically Appending Multi-Path Execution Functionality to Vanilla Script Engines", 2019 Computer Security Symposium (CSS2019), pp. 961-968, 2019.

SUMMARY OF INVENTION

Technical Problem

Here, when the attacker intentionally makes an exception, the execution of the analysis may be stopped to interfere with the analysis. In addition, in the multipath execution by the path forcible execution, by forcing the execution path, an exception that cannot occur in normal execution may occur, and the execution may be stopped. Since the execution of the analysis is stopped when the exception occurs, there is a demand for a technique capable of continuing the execution of the analysis even when the exception occurs.

For this purpose, when an exception occurs, it is necessary to forcibly skip a part that causes the exception and continue execution. At this time, how much range should be skipped, for example, whether the instruction currently being executed should be skipped, whether the basic block should be skipped, or whether the function should be skipped depends on the exception that has occurred.

Thus, as one of techniques for suppressing the stop of the execution due to the exception, a technique for skipping the basic block that has caused the exception and continuing the execution is required.

The present invention has been made in view of the above, and an object is to provide an analysis function providing method, an analysis function providing device, and an analysis function providing program capable of providing a script engine with an execution function that suppresses stop of execution due to an exception by skipping a basic block that has caused the exception.

Solution to Problem

In order to solve the above-described problem and achieve the object, an analysis function providing method is an analysis function providing method executed by an analysis function providing device, the analysis function providing method including: first analyzing a virtual machine of a script engine, and acquiring a hook point that is a part where an analysis code is inserted by applying a hook, and a virtual program counter that is a variable indicating an instruction of the virtual machine to be executed next; second analyzing an instruction set architecture that is a system of instructions of the virtual machine and acquiring a branch virtual machine instruction that is a virtual machine instruction that causes branch; and providing an analysis function by applying a hook, to the hook point of the script engine, the hook including processing of, when an exception has occurred, changing a destination pointed by the virtual program counter to a head of a basic block immediately after a basic block in which the exception has occurred on a basis of the virtual program counter and the branch virtual machine instruction that are architecture information obtained by analysis.

Advantageous Effects of Invention

According to the present invention, it is possible to provide the script engine with the execution function that suppresses the stop of the execution due to the exception.

BRIEF DESCRIPTION OF DRAWINGS

FIG. 4 is a diagram illustrating an example of a test script used for virtual program counter (VPC) detection.

FIG. 5 is a diagram illustrating an example of a test script used for branch VM instruction detection.

FIG. 6 is a diagram illustrating an example of an execution trace.

FIG. 7 is a diagram illustrating an example of a VM execution trace.

FIG. 29 is a diagram illustrating a code piece indicating an example of analysis interference.

DESCRIPTION OF EMBODIMENTS

Hereinafter, an embodiment of an analysis function providing method, an analysis function providing device, and an analysis function providing program according to the present application will be described in detail on the basis of the drawings. In addition, the present invention is not limited to the embodiment described below.

[Embodiment] The analysis function providing device according to the embodiment is an analysis function providing device applicable to a script engine.

The analysis function providing device according to the present embodiment executes a test script while monitoring the binary of the script engine to acquire a branch trace and a memory access trace as an execution trace.

Then, the analysis function providing device analyzes a virtual machine on the basis of the execution trace, and acquires architecture information of a hook point, a tap point, a virtual program counter (VPC), which is a variable indicating a VM instruction to be executed next, a boundary of the VM instruction, and a dispatcher. Note that these are all components of the script engine, are pieces of information regarding architecture, and stored in an architecture information DB 132 (described below).

Further, the analysis function providing device executes the test script to acquire the VM execution trace, and analyzes an instruction set architecture by using the VM execution trace. As a result, the analysis function providing device acquires a branch VM instruction, which is a VM instruction that causes branch in the script, as the architecture information.

Then, the analysis function providing device inserts a hook using a hook handler to the hook point of the script engine on the basis of the acquired architecture information. Further, the analysis function providing device inserts an exception handler into a script to be analyzed and provides an exception handling function. The exception handler has a function of forcibly transferring processing to a VM area when the occurrence of the exception is caught. Then, a function of skipping the basic block in which the exception has occurred by changing the destination pointed by the VPC to the head of a basic block immediately after the basic block in which the exception has occurred is added to the hook handler. As a result, the analysis function providing device shifts the processing to the VM area when the exception occurs, and skips the basic block in which the exception has occurred as instructed by the hook handler, thereby suppressing the stop of the execution due to the exception.

Figure 1:
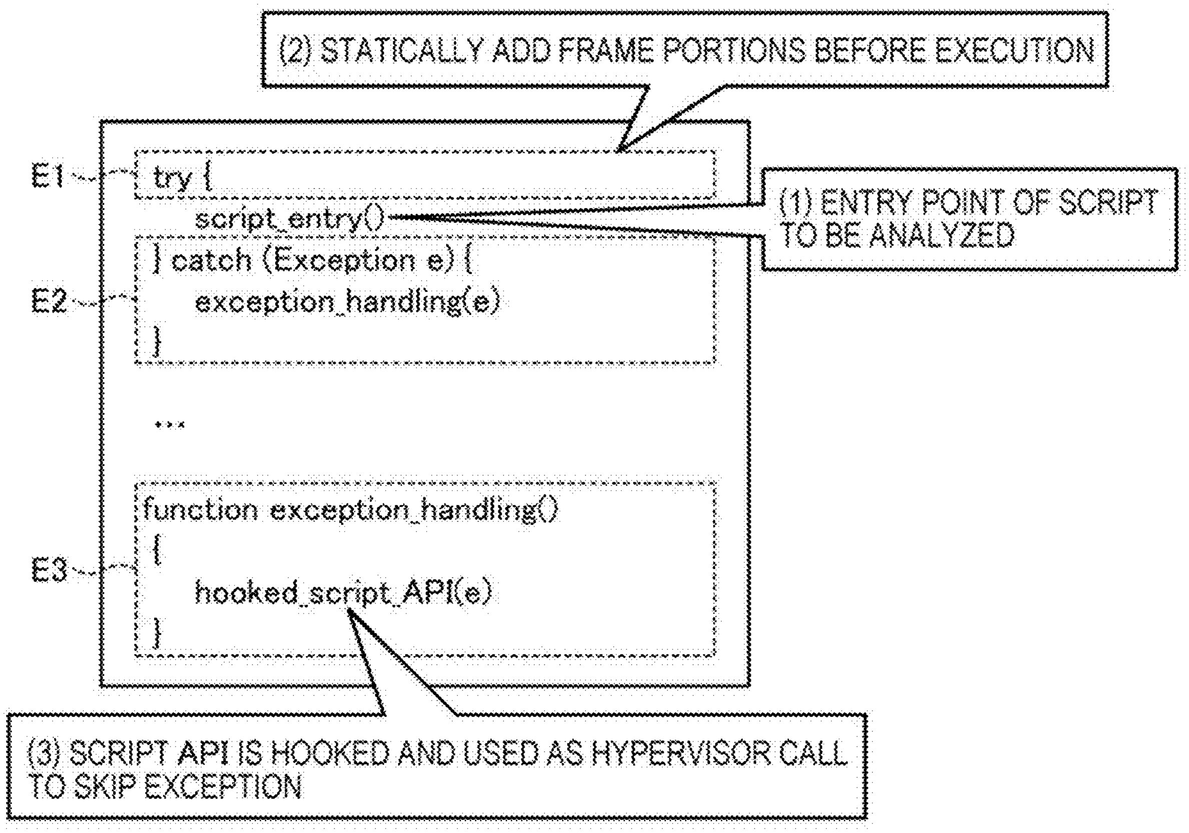
FIG. 1 is a diagram describing an example of an exception handler.
Figure 2:
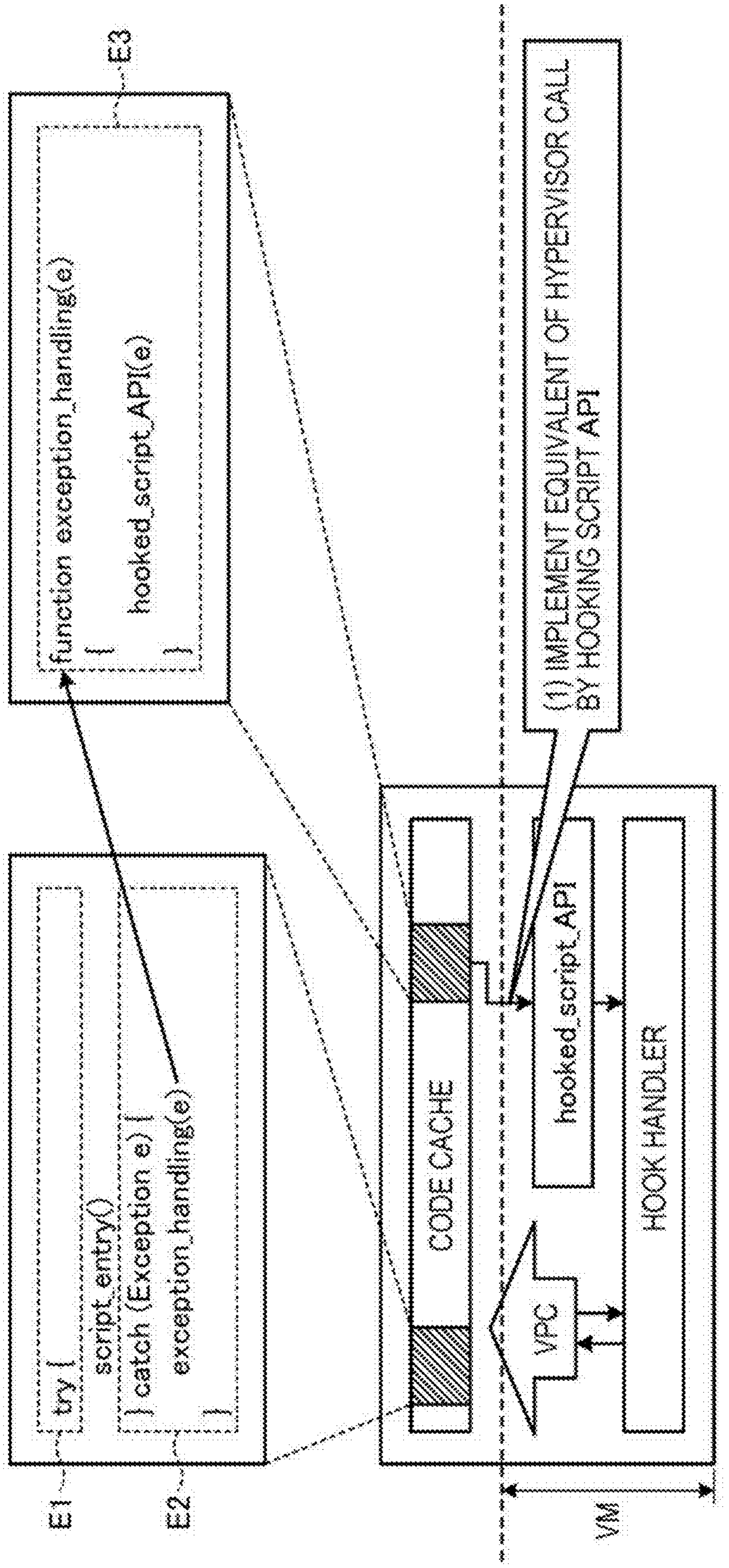
FIG. 2 is a diagram illustrating an example of a hypervisor call using a hook of a script API.

FIG. 1 is a diagram describing an example of an exception handler. FIG. 2 is a diagram illustrating an example of a hypervisor call using a hook of a script API. As illustrated in FIG. 1, the analysis function providing device statically adds the contents of frame portions E1 to E3 to an entry point of the script to be analyzed before execution ((1) and (2) in FIG. 1).

Specifically, as illustrated in FIG. 1, the analysis function providing device adds codes "try" and "catch" to the entry point of the script to be analyzed (frames E1 and E2), and adds a code "hooked_script_API(e)" that hooks the script API in a case where an exception occurs as in the third line of the frame E3. As a result, at the time of exception, the script API is hooked and used as a hypervisor call to skip the exception ((3) in FIG. 1). That is, as illustrated in FIG. 2, the analysis function providing device implements an equivalent of the hypervisor call by the hook of the script API ((1) in FIG. 2), and thus shifts the processing to the VM area when the exception occurs and skips the basic block in which the exception has occurred as instructed by the hook handler.

As described above, the analysis function providing device catches the exception and inserts the exception handler into the script to be analyzed to forcibly advance the execution to a part ahead of the part where the exception has occurred, thereby continuing the analysis while preventing the unintended stop of the execution.

Figure 3:
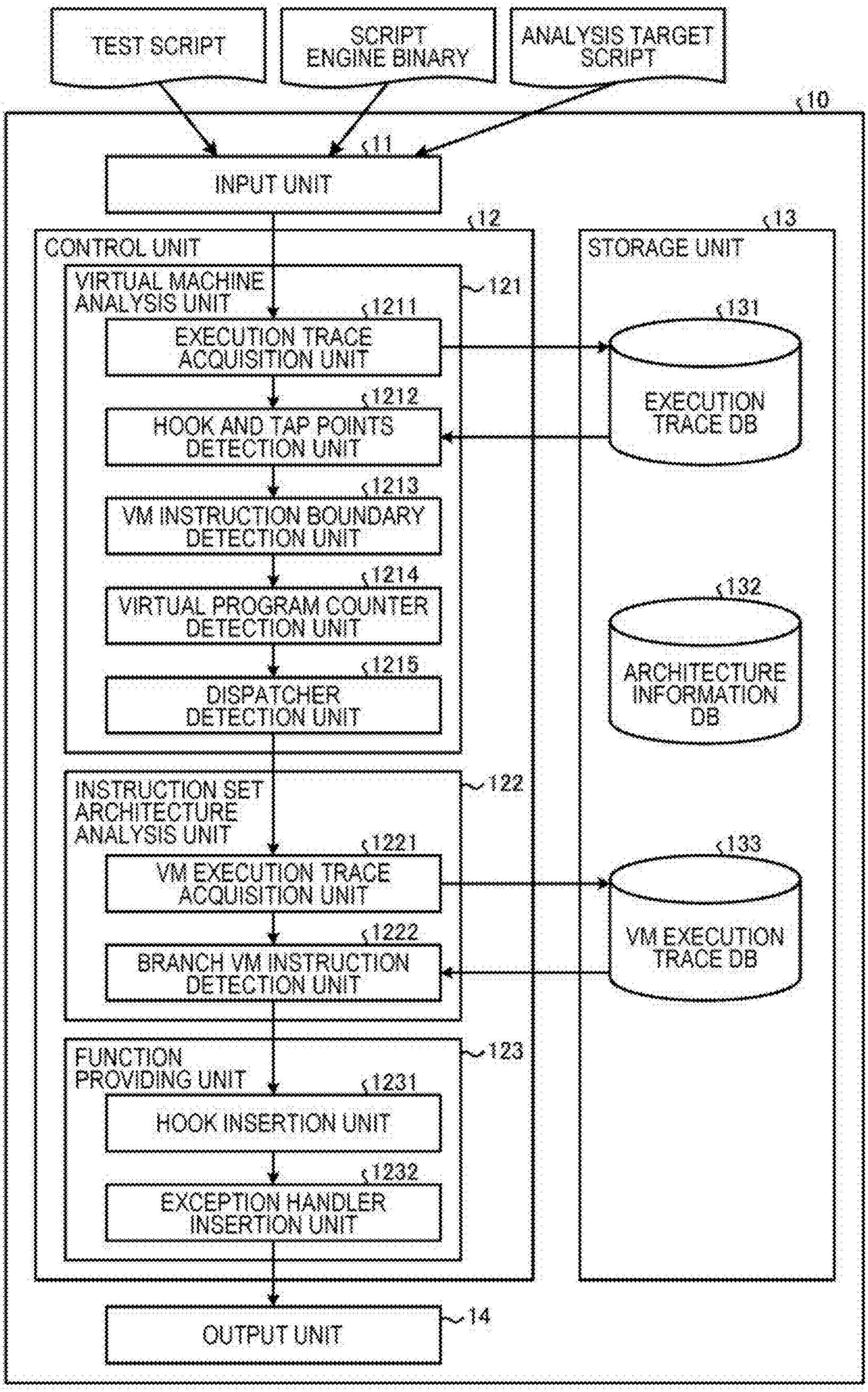
FIG. 3 is a diagram describing an example of a configuration of an analysis function providing device according to an embodiment.

[Configuration of Analysis Function Providing Device] Next, a configuration of an analysis function providing device 10 according to the embodiment will be specifically described with reference to FIG. 3. FIG. 3 is a diagram describing an example of a configuration of an analysis function providing device according to an embodiment.

As illustrated in FIG. 3, the analysis function providing device 10 includes an input unit 11, a control unit 12, a storage unit 13, and an output unit 14. Then, the analysis function providing device 10 receives inputs of a test script, a script engine binary, and an analysis target script.

The input unit 11 includes an input device such as a keyboard or a mouse, receives input of information from the outside, and inputs the information to the control unit 12. In addition, the input unit 11 includes a communication interface that transmits and receives various types of information to and from another device connected via a wired connection, a network, or the like, and receives an input of information transmitted from the other device. The input unit 11 receives inputs of the test script and the script engine binary, and outputs the test script and the script engine binary to the control unit 12. The test script is a script input when the script engine is dynamically analyzed and the execution trace and the VM execution trace are acquired. Note that details of the test script will be described below. The script engine binary is an executable file constituting the script engine. The script engine binary may include a plurality of executable files. The analysis target script is a script to be analyzed.

The control unit 12 includes internal memory for storing a program defining various processing procedures and the like and required data, and executes various types of processing by using the program and data. For example, the control unit 12 is an electronic circuit such as a central processing unit (CPU) or a micro processing unit (MPU). The control unit 12 includes a virtual machine analysis unit 121 (first analysis unit), an instruction set architecture analysis unit 122 (second analysis unit), and a function providing unit 123 (providing unit).

The virtual machine analysis unit 121 analyzes the VM of the script engine. The virtual machine analysis unit 121 acquires a plurality of execution traces by changing conditions at the time of execution, analyzes the plurality of execution traces by using differential execution analysis, and acquires a hook point, a tap point, and a VPC. In addition, the virtual machine analysis unit 121 analyzes the script engine binary to acquire the VM instruction boundary and the dispatcher. The virtual machine analysis unit 121 includes an execution trace acquisition unit 1211, a hook and tap points detection unit 1212, a VM instruction boundary detection unit 1213, a virtual program counter detection unit 1214, and a dispatcher detection unit 1215.

The execution trace acquisition unit 1211 receives the test script and the script engine binary as inputs. The execution trace acquisition unit 1211 acquires the execution trace by executing the test script while monitoring execution of the script engine binary.

The execution trace includes a branch trace and a memory access trace. The branch trace records a type of the branch instruction at the time of execution, a branch source address, and a branch destination address. The memory access trace records a type of memory operation and a memory address of an operation target. It is known that branch traces and memory access traces can be acquired by instruction hooks. The execution trace acquired by the execution trace acquisition unit 1211 is stored in an execution trace DB 131.

The hook and tap points detection unit 1212 analyzes the virtual machine on the basis of the execution trace acquired by the execution trace acquisition unit 1211, and detects a hook point and a tap point. Here, the hook point is a part where the hook is applied and an analysis code is inserted. In the embodiment, a function (referred to as an internal function) of the internal implementation of the script engine is used as a unit, and the hook is applied to the head of the internal function. In addition, the tap point is a memory monitoring part for outputting a log using an analysis code, and is assumed to be any of arguments of the internal function.

The hook and tap points detection unit 1212 extracts and analyzes the execution trace stored in the execution trace DB 131, and finds a possibility of the hook point. The hook and tap points detection unit 1212 searches the execution trace for a call of a system API related to the analysis target, and detects a hook point possibility by back trace from the system API. The hook and tap points detection unit 1212 detects a hook point by applying back trace from the system API corresponding to a language element to be analyzed (for example, script API).

The hook and tap points detection unit 1212 extracts a difference between a plurality of execution traces having different acquisition conditions, and detects a hook point possibility by finding a portion satisfying a specific condition. The hook and tap points detection unit 1212 detects a hook point on the basis of a difference seen between execution traces in which a plurality of conditions is changed. At this time, the hook and tap points detection unit 1212 detects the hook point using an algorithm (for example, the Smith-Waterman algorithm) that detects that a highly homologous series appears a specific number of times.

The hook and tap points detection unit 1212 applies the hook to the obtained hook point possibility and searches the memory of an argument of the function to which the hook has been applied to detect a tap point. The hook and tap points detection unit 1212 detects a tap point, which is a memory monitoring part for outputting a log using an analysis code, on the basis of the monitoring at the hook point. In addition, the hook and tap points detection unit 1212 determines a hook point possibility having a tap point as a hook point. Note that, for details of the processing of the hook and tap points detection unit 1212, see WO 2020/075335 A.

The VM instruction boundary detection unit 1213 clusters the execution traces and detects the boundary of each VM instruction. The VM instruction boundary detection unit 1213 clusters the execution traces and detects the cluster the number of times of execution of which is greater than or equal to the threshold as the VM instruction. In clustering, a continuous code area executed a plurality of times is detected. This may be done, for example, by putting together those having a close distance on the code between executed instructions, by searching for a common subsequence of executed code blocks, or by other methods. The analysis function providing device 10 detects a start point and an end point of continuous instruction sequence constituting the detected VM instruction as boundaries. The boundary of the VM instruction detected here is used in VPC detection and dispatcher detection.

The virtual program counter detection unit 1214 extracts and analyzes the execution trace for the first test script stored in the execution trace DB 131, and detects the VPC. The virtual program counter detection unit 1214 analyzes the plurality of execution traces by using the differential execution analysis focusing on the number of times of reading the memory and the boundary of each VM instruction detected by the VM instruction boundary detection unit 1213, and detects the VPC. The virtual program counter detection unit 1214 detects the VPC by using the fact that reading into the memory holding the VPC always occurs after execution of each VM instruction and finding a destination of the reading.

For this reason, the virtual program counter detection unit 1214 uses the differential execution analysis focusing on the number of times of reading the memory as detection of the VPC. The virtual program counter detection unit 1214 compares the plurality of execution traces of the test script acquired by using the test script, and finds a memory in which the number of times of reading the memory changes in proportion to an increase or decrease in both the number of repetitions and the number of repeated sentences. Then, the virtual program counter detection unit 1214 refers to the boundary of each VM instruction detected by the VM instruction boundary detection unit 1213 and performs narrowing-down to one in which a value of a read memory always points to the start point of the VM instruction. The virtual program counter detection unit 1214 detects this memory as the VPC.

The dispatcher detection unit 1215 cuts out each VM instruction portion from the script engine binary on the basis of the boundary of the VM instruction detected by the VM instruction boundary detection unit 1213, and detects a portion having high similarity between the VM instructions as the dispatcher. As a premise, the dispatcher is implemented by referring to the pointer cache and jumping to the pointer of the next VM instruction handler. Dispatchers are distributedly arranged behind respective VM instruction handlers, and identity of their codes are generally high. The analysis function providing device detects the dispatcher by a predetermined method by searching for a code that is present behind the VM instruction handler and has high identity. For detection of a portion having high similarity, for example, a sequence alignment algorithm may be used, or other methods may be used.

The instruction set architecture analysis unit 122 analyzes an instruction set architecture that is a system of instructions of the VM. The instruction set architecture analysis unit 122 includes a VM execution trace acquisition unit 1221 (first acquisition unit) and a branch VM instruction detection unit 1222 (first detection unit).

Like the execution trace acquisition unit 1211, the VM execution trace acquisition unit 1221 receives the test script and the script engine binary as inputs. The VM execution trace acquisition unit 1221 acquires the VM execution trace by monitoring the VPC and monitoring the pointer of the VM instruction handler dispatched by the dispatcher. The VM execution trace acquisition unit 1221 acquires the VM execution trace that is the execution trace executed on the VM by executing the test script while monitoring execution of the script engine binary. In detection of the branch VM instruction, the VM execution trace acquisition unit 1221 executes a large number of test scripts to acquire the VM execution trace. The VM execution trace acquisition unit 1221 associates the pointer to the VM instruction with the VM instruction, and virtually allocates a VM opcode as an identifier to each.

The VM execution trace is a record of the pointer of the executed VM instruction handler and the VPC. Specifically, the VM execution trace includes the VPC and VM opcode for each executed VM instruction. Recording of the VPC can be implemented by monitoring the memory of the VPC detected by the virtual program counter detection unit 1214. The VM opcode is an identifier virtually allocated to each of the pointers to the VM instructions and the VM instructions associated with each other. The VM execution trace acquired by the VM execution trace acquisition unit 1221 is stored in a VM execution trace DB 133.

The branch VM instruction detection unit 1222 extracts and analyzes the VM execution trace stored in the VM execution trace DB 133, and detects the branch VM instruction. The branch VM instruction detection unit 1222 aggregates the amount of change in the VPC before and after execution for each VM opcode allocated as an identifier. In a case where the VM opcode is of other than the branch VM instruction, the amount of change in the VPC is substantially constant. On the other hand, in a case where the VM opcode is of the branch VM instruction, a variation occurs in the VPC depending on the branch destination.

Therefore, the branch VM instruction detection unit 1222 detects the branch VM instruction on the basis of a variation in the amount of change in the virtual program counter for each VM opcode of the VM execution trace. The branch VM instruction detection unit 1222 focuses on the fact that the magnitude of variation in the value of the VPC is different between the branch VM instruction and the other VM instructions, determines a threshold, and detects one having a larger variation in the value of the VPC as the branch VM instruction. Specifically, the branch VM instruction detection unit 1222 evaluates the variation of the amount of change in the VPC for each VM opcode by a variance, and detects one having the variance greater than or equal to a certain threshold as the branch VM instruction.

In addition, the branch VM instruction detection unit 1222 determines a conditional branch VM instruction among the branch VM instructions in order to construct an elaborate control flow graph. At the time of the conditional branch, an access to the conditional branch flag always occurs in order to determine the branch destination. Therefore, the conditional branch VM instruction can be determined by verifying whether the conditional branch flag is accessed when each branch VM instruction is executed. In other words, when the branch VM instruction is executed, it can be determined that the instruction is the conditional branch VM instruction when the conditional branch flag is accessed, and the instruction is not the conditional branch VM instruction when the conditional branch flag is not accessed. Therefore, on the basis of the VM execution trace and the memory access trace, the branch VM instruction detection unit 1222 determines a branch VM instruction accompanied by access to the conditional branch flag as a conditional branch VM instruction.

Further, the branch VM instruction detection unit 1222 also determines call and return VM instructions. The branch by the call VM instruction is characterized by that an immediately following address on the byte code of the caller is stored, and after execution of a called subroutine, the address returns to the stored address by the return VM instruction. Therefore, when a certain branch VM instruction is instruction 1 and a subsequent other branch VM instruction is instruction 2 and when returning to the immediately following address on the byte code of instruction 1 by instruction 2, the branch VM instruction detection unit 1222 determines a set of instruction 1 and instruction 2 as call and return VM instructions.

The function providing unit 123 inserts a hook into the script engine on the basis of the acquired architecture information, inserts an exception handler into the script to be analyzed, and provides an exception handling function. On the basis of the VPC and the branch VM instruction which are architecture information obtained by analysis by the virtual machine analysis unit 121 and the instruction set architecture analysis unit 122, the function providing unit 123 provides an analysis function by applying, to the hook point of the script engine, the hook including processing of changing the destination pointed by the VPC to the head of the basic block immediately after the basic block in which an exception has occurred when the exception has occurred. The function providing unit 123 includes a hook insertion unit 1231 and an exception handler insertion unit 1232.

The hook insertion unit 1231 inserts a hook into the script engine. The hook insertion unit 1231 applies the hook to the script engine on the basis of architecture information obtained by the analysis by the virtual machine analysis unit 121 and the instruction set architecture analysis unit 122. The hook insertion unit 1231 receives the hook point and the tap point, and inserts the hook into the script engine by using the hook handler on the basis of the hook point and the tap point to provide the analysis function. The hook handler includes processing of changing the destination pointed by the VPC to the head of the basic block immediately after the basic block in which the exception has occurred in the VM area.

Specifically, the hook insertion unit 1231 adds, to the hook handler, VM branch trace construction processing (first processing), control flow graph construction processing (second processing), and basic block skip processing (third processing) of skipping the basic block in which the exception has occurred. As a result, a function of skipping the basic block in which the exception has occurred by changing the destination pointed by the VPC to the head of a basic block immediately after the basic block, which is the basic block in which the exception has occurred, is added to the hook. The VM branch trace construction processing constructs the VM branch trace associated with the VPC before and after execution of the branch VM instruction. The control flow graph construction processing constructs the control flow graph in which the basic block is a node and the branch by execution of the branch VM instruction is an edge using the VM branch trace.

The exception handler insertion unit 1232 inserts an exception handler into a script to be analyzed and provides an exception handling function. The exception handler has a function of forcibly transferring processing to a VM area when the occurrence of the exception is caught. The exception handler insertion unit 1232 analyzes the script to be analyzed, and inserts an exception handler by adding a code (see, for example, FIG. 1) of the exception handler to each entry point so that an exception in the code after the entry point can be caught.

The storage unit 13 is implemented by a semiconductor memory element such as random access memory (RAM) or flash memory, or a storage device such as a hard disk or an optical disk, and stores a processing program for operating the analysis function providing device 10, data used during execution of the processing program, and the like. The storage unit 13 includes the execution trace database (DB) 131, the VM execution trace DB 133, and the architecture information DB 132 that stores the architecture information acquired by the virtual machine analysis unit 121 and the instruction set architecture analysis unit 122.

The execution trace DB 131 and the VM execution trace DB 133 store the execution trace and the VM execution trace acquired by the execution trace acquisition unit 1211 and the VM execution trace acquisition unit 1221, respectively. The execution trace DB 131 and the VM execution trace DB 133 are managed by the analysis function providing device 10. Of course, the execution trace DB 131 and the VM execution trace DB 133 may be managed by another device (server or the like), and in this case, the execution trace acquisition unit 1211 and the VM execution trace acquisition unit 1221 output the acquired execution trace and VM execution trace to a management server or the like of the execution trace DB 131 and the VM execution trace DB 133 via a communication interface of the output unit 14, and cause the execution trace DB 131 and the VM execution trace DB 133 to store them.

The output unit 14 is, for example, a liquid crystal display, a printer, or the like, and outputs various types of information including information regarding the analysis function providing device 10. In addition, the output unit 14 may be an interface that controls input and output of various types of data from and to an external device, and may output various types of information to the external device.

[Configuration of Test Script] The test script will be described. The test script is a script input when the script engine is dynamically analyzed. This test script is used to capture a difference in behavior of the script engine that occurs when, focusing on the number of times of execution of the branch instruction and memory reading/writing, test scripts of different numbers of times are executed. This test script is prepared in advance for analysis and is created manually. This creation requires knowledge about the specification of the target script language.

FIG. 4 is a diagram illustrating an example of a test script (first test script) used for detection of the VPC. In the first test script, repetitive processing is used (second line). In the first test script, the condition at the time of execution is changed by increasing or decreasing the number of repetitions (second line) and the number of repeated sentences (third to fifth lines) in the test script, and a difference is generated.

FIG. 5 is a diagram illustrating an example of a test script (second test script) used for branch VM instruction detection. The second test script uses a plurality of times of conditional branch (fourth to eighth lines). In the second test script, in the plurality of times of conditional branch, the branch condition is controlled so that the branch is made or not made in a pattern of a specific order (first line and fifth line). In the second test script, the number of times of conditional branch and the order pattern of success/failure of the branch are changed, and a difference is generated.

[Configuration of Execution Trace] Next, the execution trace will be described. FIG. 6 is a diagram illustrating an example of the execution trace. As described above, the execution trace includes a branch trace and a memory access trace. FIG. 6 is a partial cutout of the execution trace. Hereinafter, a configuration of the execution trace will be described with reference to FIG. 6.

The execution trace includes an element called trace. The trace indicates whether the log line is a branch trace or a memory access trace.

The log line of the branch trace has, for example, a format as described in the first to tenth lines in FIG. 6, and includes three elements: type, src, and dst. The type indicates whether the executed branch instruction is based on a call instruction, a jmp instruction, or a ret instruction. In addition, the src indicates an address of a branch source, and the dst indicates an address of a branch destination.

The log line of the memory access trace has, for example, a format as described in the eleventh to thirteenth lines in FIG. 6, and includes three elements: type, target, and value. The type indicates whether the memory access is of reading or writing. The target indicates a memory address that is a target of the memory access. In addition, the value stores a value of a result of the memory access.

[Configuration of VM Execution Trace] Next, the VM execution trace will be described. FIG. 7 is a diagram illustrating an example of the VM execution trace. As described above, the VM execution trace is a record of the VM opcode and the VPC. FIG. 7 is a partial cutout of the VM execution trace. Hereinafter, a configuration of the VM execution trace will be described with reference to FIG. 7.

The log line of the VM execution trace has, for example, a format as described in FIG. 7, and includes two elements: vpc and vmop (vm opcode). The vpc indicates a value of the VPC. In addition, the vmop indicates a value of the VM opcode virtually allocated for each pointer that is acquired from the pointer cache and indicates the head of the VM instruction handler to be executed.

Figure 8:
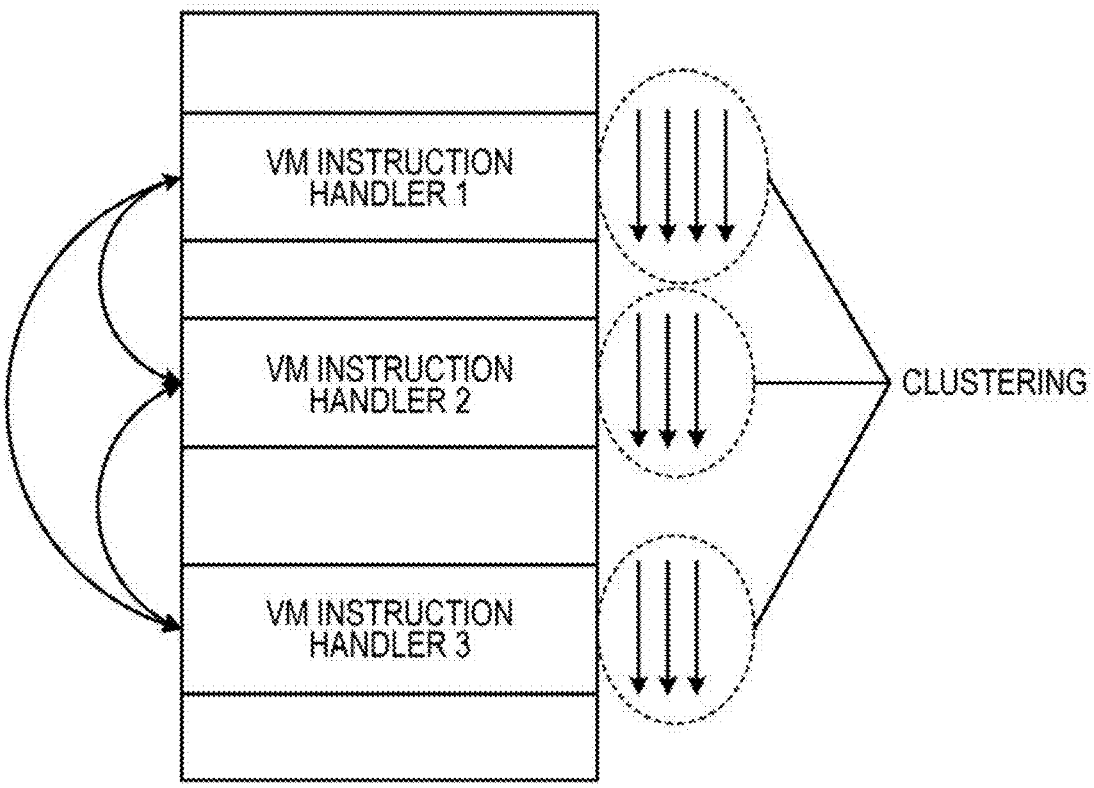
FIG. 8 is a diagram describing processing of a VM instruction boundary detection unit.

[Processing of VM Instruction Boundary Detection Unit] Next, processing of the VM instruction boundary detection unit 1213 will be described. FIG. 8 is a diagram describing processing of the VM instruction boundary detection unit 1213.

The VM instruction boundary detection unit 1213 detects the boundary of each VM instruction. At this time, the VM instruction boundary detection unit 1213 detects the VM instruction and the boundary thereof for a threaded code type VM in which it is difficult to grasp the boundary of the VM instruction since there is no interpreter loop. Specifically, the VM instruction boundary detection unit 1213 extracts the execution trace from the execution trace DB 131. Then, as illustrated in FIG. 8, the VM instruction boundary detection unit 1213 clusters the execution traces by a predetermined method, and detects the cluster the number of times of execution of which is greater than or equal to the threshold as the VM instruction (for example, VM instruction handlers 1 to 3). The VM instruction boundary detection unit 1213 detects a start point and an end point of continuous instruction sequence constituting the VM instruction as boundaries.

Figure 9:
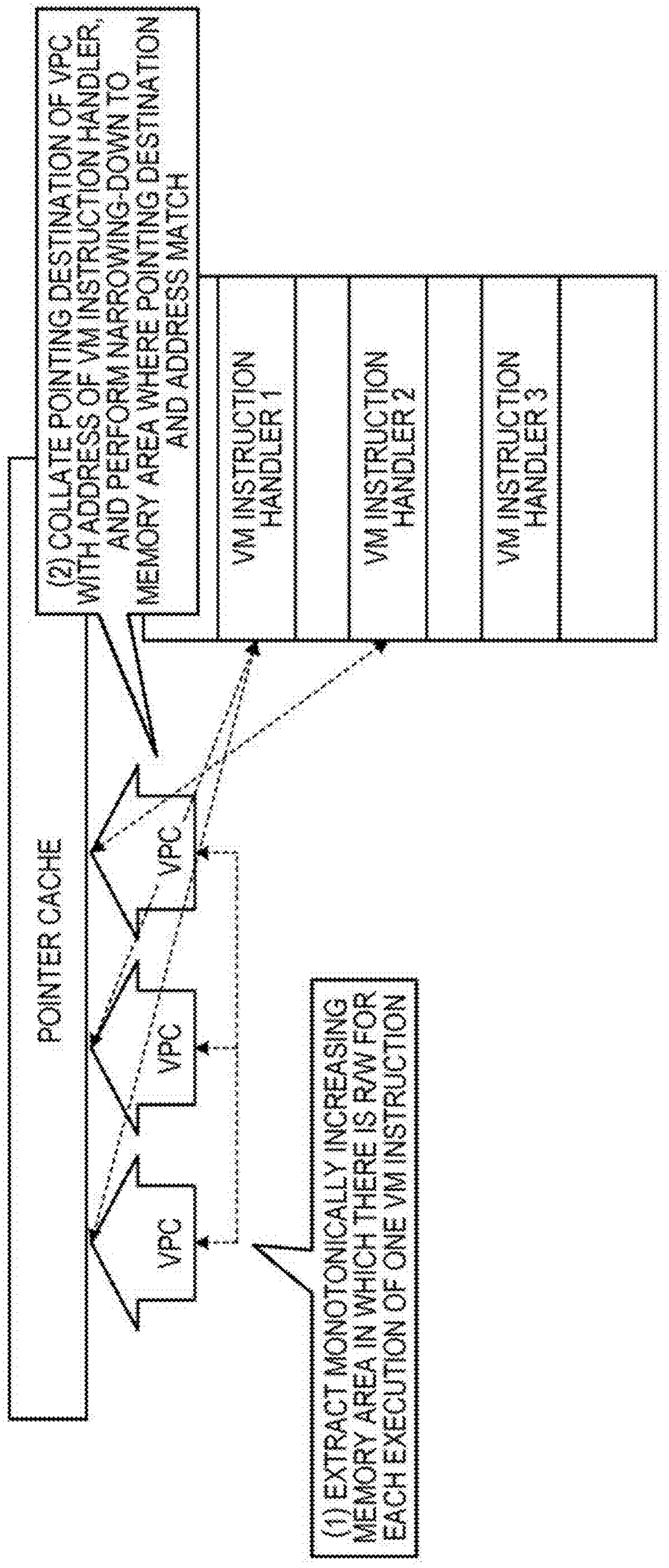
FIG. 9 is a diagram describing processing of a virtual program counter detection unit.

[Processing of Virtual Program Counter Detection Unit] Next, processing of the virtual program counter detection unit 1214 will be described. The virtual program counter detection unit 1214 detects the VPC and the pointer cache. Detection of the virtual program counter is implemented by analyzing the log of the memory access trace of the acquired execution trace. The virtual program counter detection unit 1214 uses the differential execution analysis focusing on the number of times of reading the memory. FIG. 9 is a diagram describing processing of the virtual program counter detection unit 1214.

The virtual program counter detection unit 1214 extracts one execution trace by the first test script from the execution trace DB 131. The number of times of reading the VPC is proportional to the number of repetitions in the test script and the number of sentences in the repetitive processing. Assuming that the number of repetitions is N and the number of repeated sentences is M, reading of the VPC of approximately MN occurs. For this reason, the virtual program counter detection unit 1214 extracts memories increased to 4MN and 9MN in the execution trace for the first test script in which N and M are increased to 2N and 2M and 3N and 3M, respectively. Specifically, as illustrated in FIG. 9, the virtual program counter detection unit 1214 extracts a monotonically increasing memory area in which there is Read/Write for each execution of one VM instruction ((1) in FIG. 9).

Then, the virtual program counter detection unit 1214 detects, as the VPC, one in which the value of the read memory always points to the start point of the VM instruction. Specifically, the virtual program counter detection unit 1214 collates a pointing destination of the VPC with an address of the VM instruction handler, and performs narrowing-down to a memory area where the pointing destination and the address match ((2) in FIG. 9).

Figure 10:
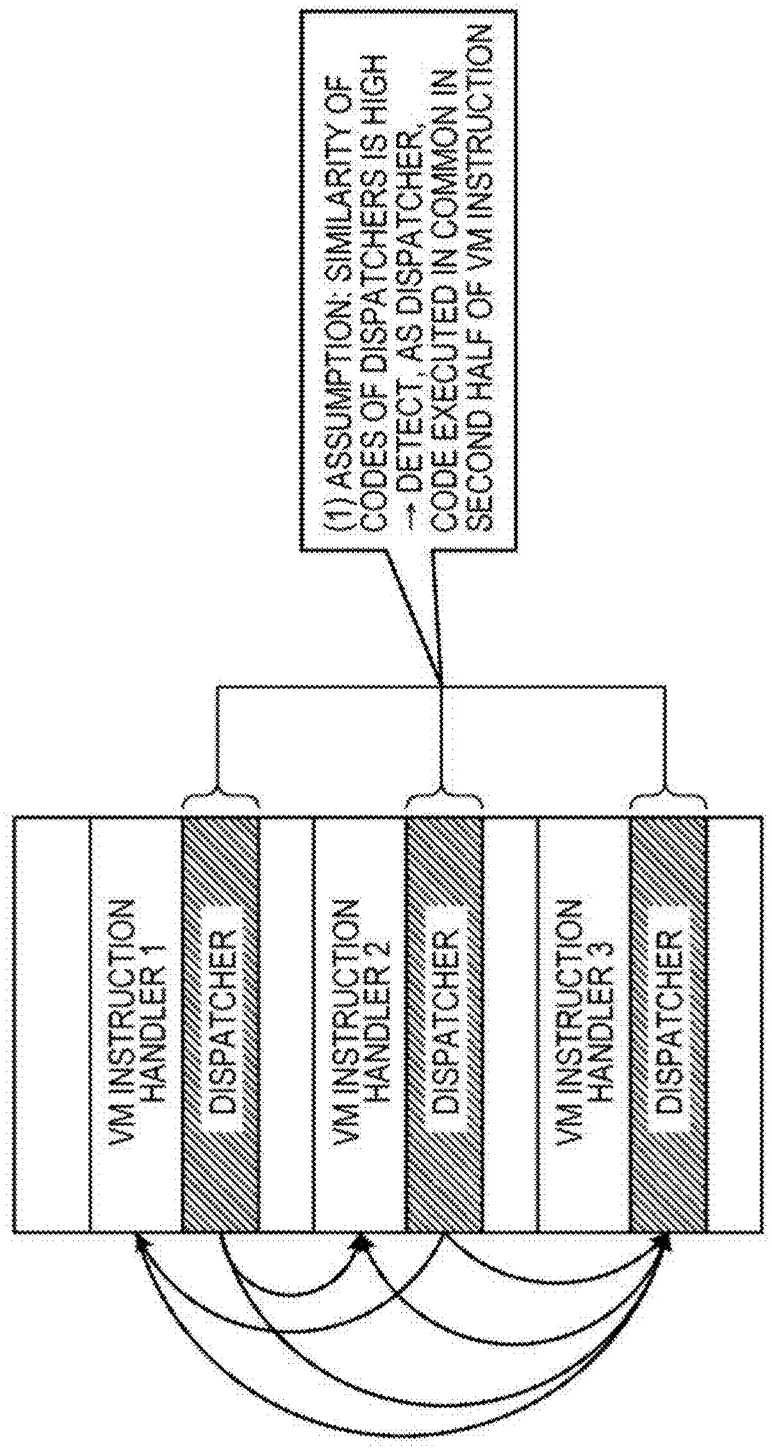
FIG. 10 is a diagram describing processing of a dispatcher detection unit.

[Processing of Dispatcher Detection Unit] Next, processing of the dispatcher detection unit 1215 will be described. The dispatcher detection unit 1215 detects the dispatcher by analyzing the binary of the script engine by a predetermined method. FIG. 10 is a diagram describing processing of the dispatcher detection unit 1215.

The dispatcher detection unit 1215 detects a dispatcher. The dispatcher detection unit 1215 cuts out each VM instruction portion from the script engine binary on the basis of the boundary of the VM instruction detected by the VM instruction boundary detection unit 1213. Then, on the assumption that similarity of codes of dispatchers is high ((1) in FIG. 10), the dispatcher detection unit 1215 calculates the similarity between the codes among the VM instructions, and detects a portion having high similarity among all the VM instructions as the dispatcher. The dispatcher detection unit 1215 can detect, as the dispatcher, a code executed in common in the second half of the VM instruction ((1) in FIG. 10).

[Processing of Branch VM Instruction Detection Unit] Next, processing of the branch VM instruction detection unit 1222 will be described. The branch VM instruction detection unit 1222 detects the branch VM instruction by analyzing the log of the acquired VM execution trace. Since the test script here only needs to include the branch VM instruction, any script may be used as long as the script includes branch control syntax. For example, the test script is prepared by collecting the test script from the Internet or acquiring the test script from an official document.

Figure 11:
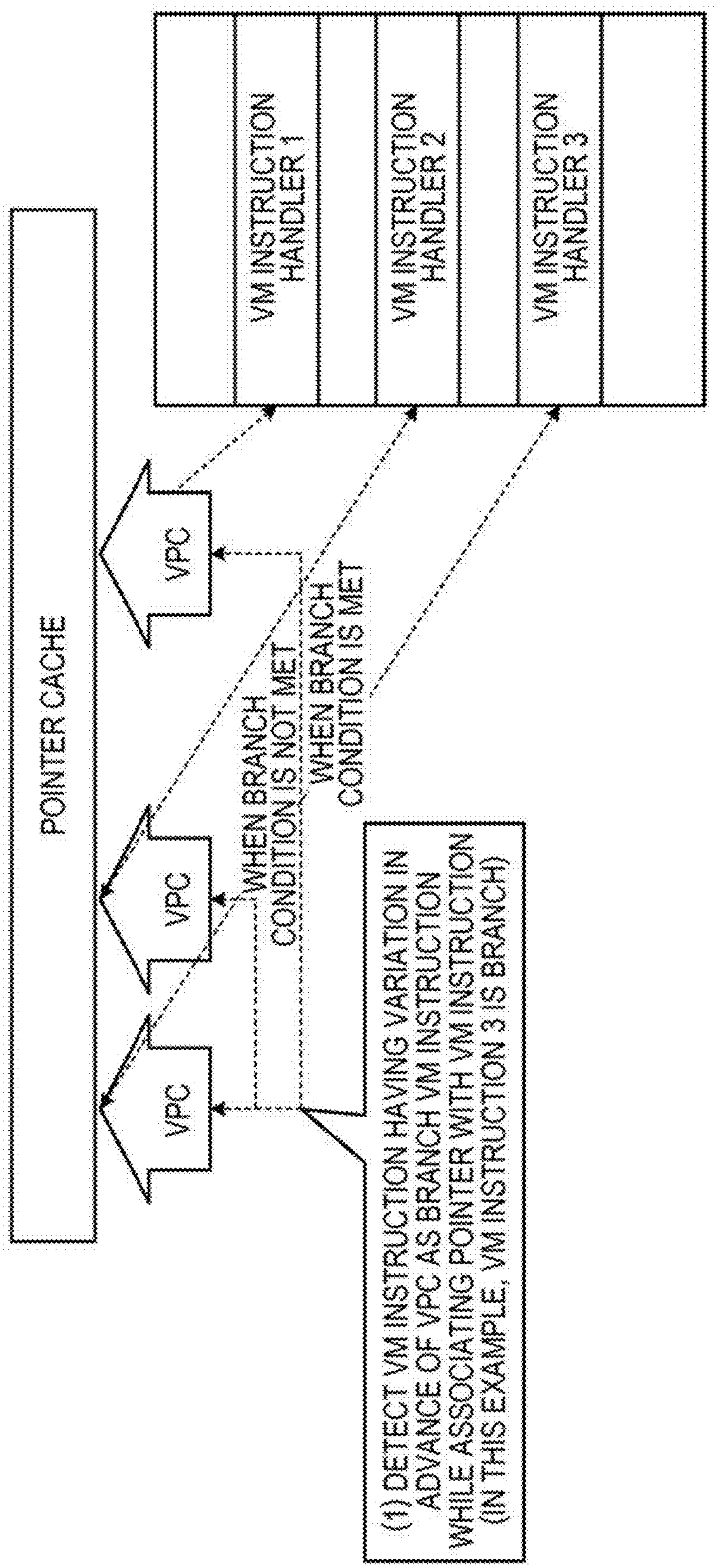
FIG. 11 is a diagram describing processing of a branch VM instruction detection unit.

First, the branch VM instruction detection unit 1222 associates the pointer to the VM instruction with the VM instruction for each VM execution trace of the VM execution trace DB 133, and virtually allocates the VM opcode as the identifier to each. FIG. 11 is a diagram describing processing of the branch VM instruction detection unit 1222.

Here, when a certain VM instruction is a branch instruction, the advance of the VPC changes depending on the branch destination. On the other hand, in a case other than the branch instruction, the advance of the VPC changes depending on the size of the VM instruction. For this reason, when a set of the opcode of the VM instruction and the pointer to the VM instruction is collected and the advance of the VPC is viewed for each opcode, the advance of the VPC varies depending on the branch destination in the case of the branch instruction.

Thus, the branch VM instruction detection unit 1222 uses the variance to evaluate the variation of the pointer to the VM instruction. The branch VM instruction detection unit 1222 calculates the variance of the amount of change in the VPC for each VM opcode, and performs narrowing-down only to VM opcodes whose calculated variance is larger than a threshold. As a result, the branch VM instruction detection unit 1222 detects a VM instruction (in the example of FIG. 11, VM instruction handler 3) having variation in the advance of the VPC as the branch VM instruction while associating the pointer with the VM instruction ((1) in FIG. 11).

When a set of pieces of advance O of the VPC for a certain opcode is $O=\{o_0, o_1, \ldots, o_N\}$ (see Expression (1) for the average of VPCo) and t is a threshold, whether or not it is a branch instruction is determined as in Expression (3) on the basis of a variance s (see Expression (2)). As a result, the branch VM instruction detection unit 1222 detects the branch VM instruction.

[Math. 1]

$$\bar{o} = \frac{1}{N}\sum_{k=0}^{N} o_k \tag{1}$$

[Math. 2]

$$s^2 = \frac{1}{N}\sum_{k=0}^{N}(o_k - \bar{o})^2 \tag{2}$$

-continued

[Math. 3]

$$IsBranch(O) = \begin{cases} \text{true} & (s > 1) \\ \text{false} & (\text{otherwise}) \end{cases} \quad (3)$$

Note that variations are hardly observed in VM instructions other than of branch, and a boundary between a branch VM instruction and other VM instructions is often clear. For this reason, as the threshold, for example, a value capable of dividing two groups obtained by plotting the obtained variance value on a number line is set.

[Processing of Hook Insertion Unit] Next, processing of the hook insertion unit 1231 will be described. The hook insertion unit 1231 receives the script engine binary and the hook point and the tap point detected in the processing so far as inputs. The hook insertion unit 1231 inserts a hook using a hook handler into the hook point of the script engine.

Here, the hook insertion unit 1231 inserts a code for analysis at the time of hooking such that when the script API corresponding to the hook is executed, the execution transitions to the processing of the hook handler in the VM area. The code for analysis can be easily generated as long as the hook point and the tap point are known. As a result, by calling the hooked script API from the script, the function of the hook handler implemented in the VM area can be called as a hypervisor call, and the provision of the analysis function is implemented.

At this time, the hook insertion unit 1231 adds, to the hook handler, VM branch trace construction processing of constructing the VM branch trace, control flow graph construction processing of constructing the control flow graph, and basic block skip processing of skipping the basic block in which the exception has occurred.

Figure 12:
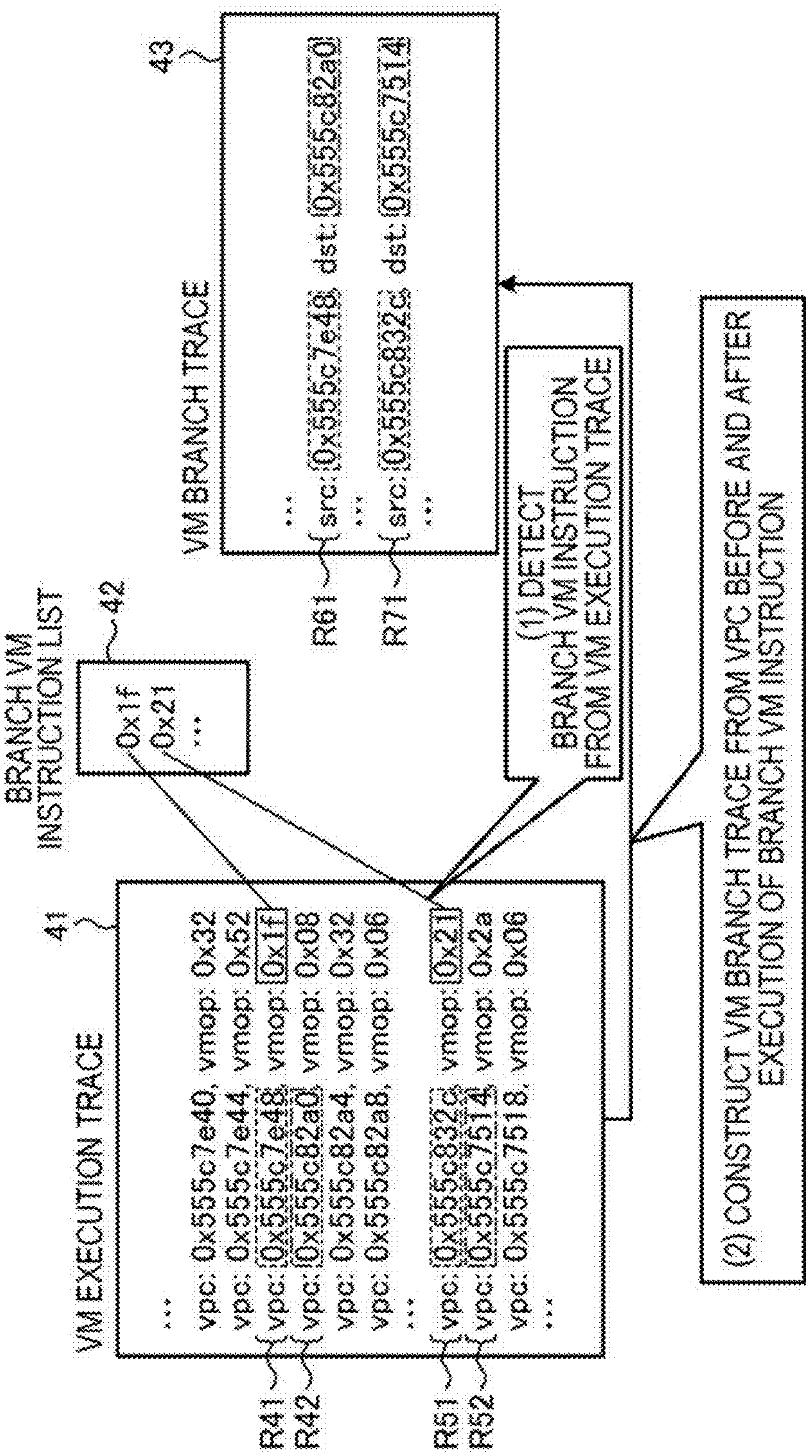
FIG. 12 is a diagram describing VM branch trace construction processing.

FIG. 12 is a diagram describing VM branch trace construction processing. In the VM branch trace construction processing, as illustrated in FIG. 12, the branch VM instruction is detected from a VM execution trace 41 in which the opcode and VPC of the executed VM instruction are recorded ((1) in FIG. 12). The branch VM instruction can be recognized by referring to a branch VM instruction list 42 detected by the branch VM instruction detection unit 1222.

Then, in the VM branch trace construction processing, a VM branch trace 43 associated with the VPC before and after execution of the detected branch VM instruction is constructed ((2) in FIG. 12). In the VM branch trace construction processing, for example, the branch VM instruction "0x1f" is detected from row R41 of the VM execution trace, and the VM branch trace indicated in row R61 is constructed on the basis of row R41 and row R42 next to row R41. That is, in the VM branch trace construction processing, the VPC "0x555c7e48" of the branch source of row R41 is associated with the VPC "0x555c82a0" of the branch source of row R42.

Similarly, in the VM branch trace construction processing, when the branch VM instruction "0x21" is detected from row R51 of the VM execution trace, the VPC "0x555c832c" of row R51 and the VPC "0x555c7514" of row R52 are associated with each other (row R71) on the basis of row R51 and next row R52.

Figure 13:
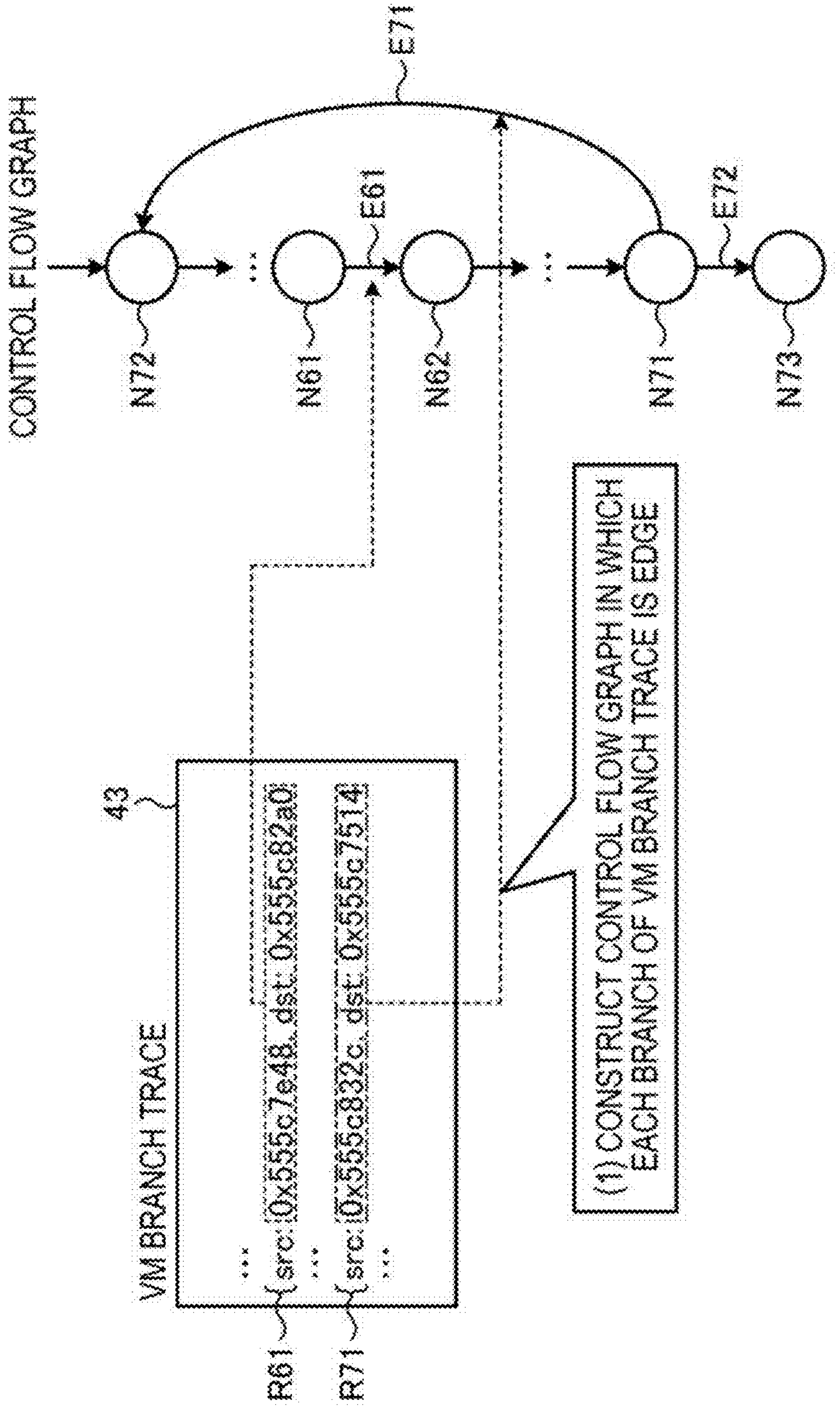
FIG. 13 is a diagram describing control flow graph construction processing.

FIG. 13 is a diagram describing control flow graph construction processing. In the control flow graph construction processing, the VM branch trace 43 constructed in the VM branch trace construction processing is used to construct a control flow graph in which basic blocks are nodes and each branch of the VM branch trace 43 is an edge ((1) in FIG. 13).

Specifically, in the control flow graph construction processing, the branch indicated in row R61 of the VM branch trace 43 is set as edge E61, the basic block of the branch source of edge E61 is set as node N61, and the basic block of the branch destination of edge E61 is set as node N62.

Then, the branch indicated in row R71 of the VM branch trace 43 is set as edge E71, the basic block of the branch source of edge E71 is set as node N71, and the basic block of the branch destination of edge E71 is set as node N72. Note that, in the example of the control flow graph of FIG. 13, node N71 has a branch indicated by edge E72 in addition to that indicated by edge E71, and the basic block of the branch destination is indicated by node N73. As described above, in the control flow graph construction processing, the control flow graph expressing the branch of the basic block in the graph structure is constructed on the basis of the VM branch trace.

Figure 14:
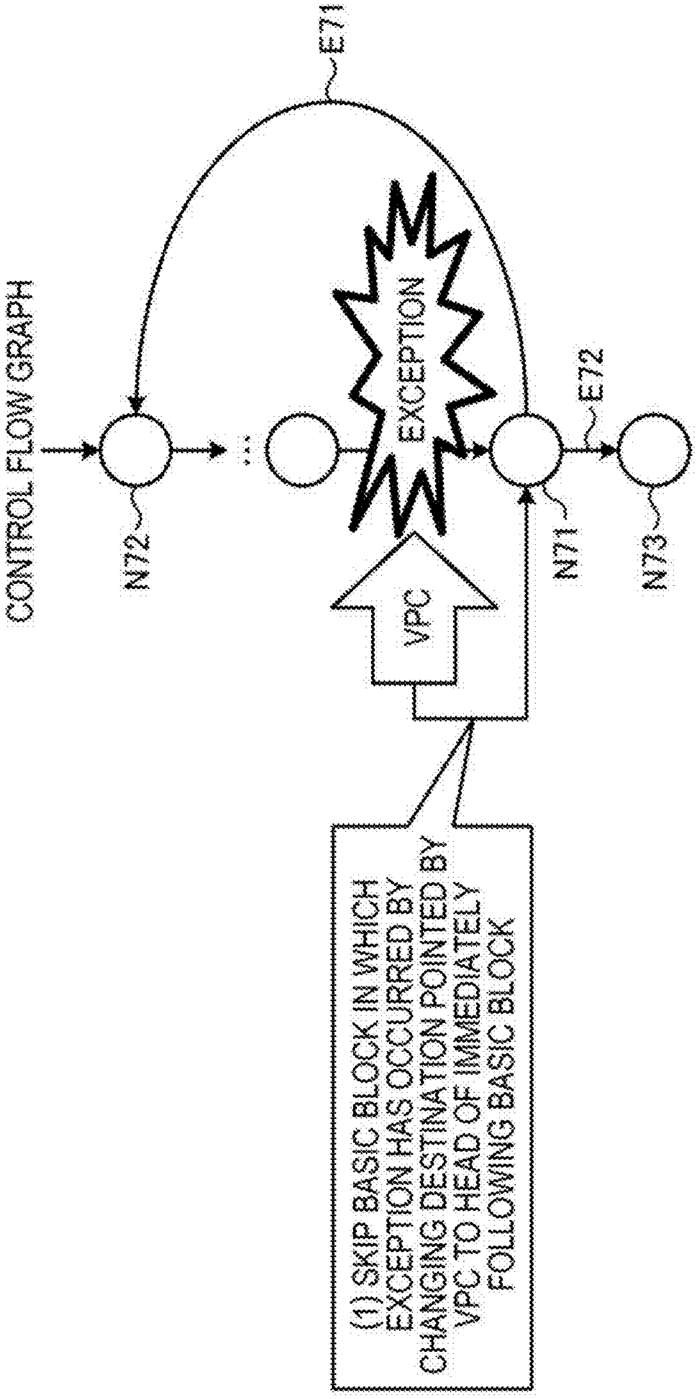
FIG. 14 is a diagram describing basic block skip processing.

FIG. 14 is a diagram describing basic block skip processing. In the basic block skip processing, the VPC is constantly tracked, and when an exception occurs, it is determined which part of the control flow graph constructed in the control flow graph construction processing this exception corresponds to. Then, the basic block skip processing is processing of skipping the basic block in which the exception has occurred by changing the destination pointed by the VPC to the head of a basic block immediately after the basic block in which the exception has occurred ((1) in FIG. 14). Specifically, in the basic block skip processing, in the example of FIG. 14, the destination pointed by the VPC is changed to node N71, which is the head immediately after the node in which the exception has occurred. Then, the processing branches and proceeds to edge E71 or edge E72 according to the execution content of node N71.

Thus, the function providing unit 123 can provide the exception skip function to the script to be analyzed by inserting the exception handler into the script to be analyzed and adding the basic block skip processing to the hook handler.

Figure 15:
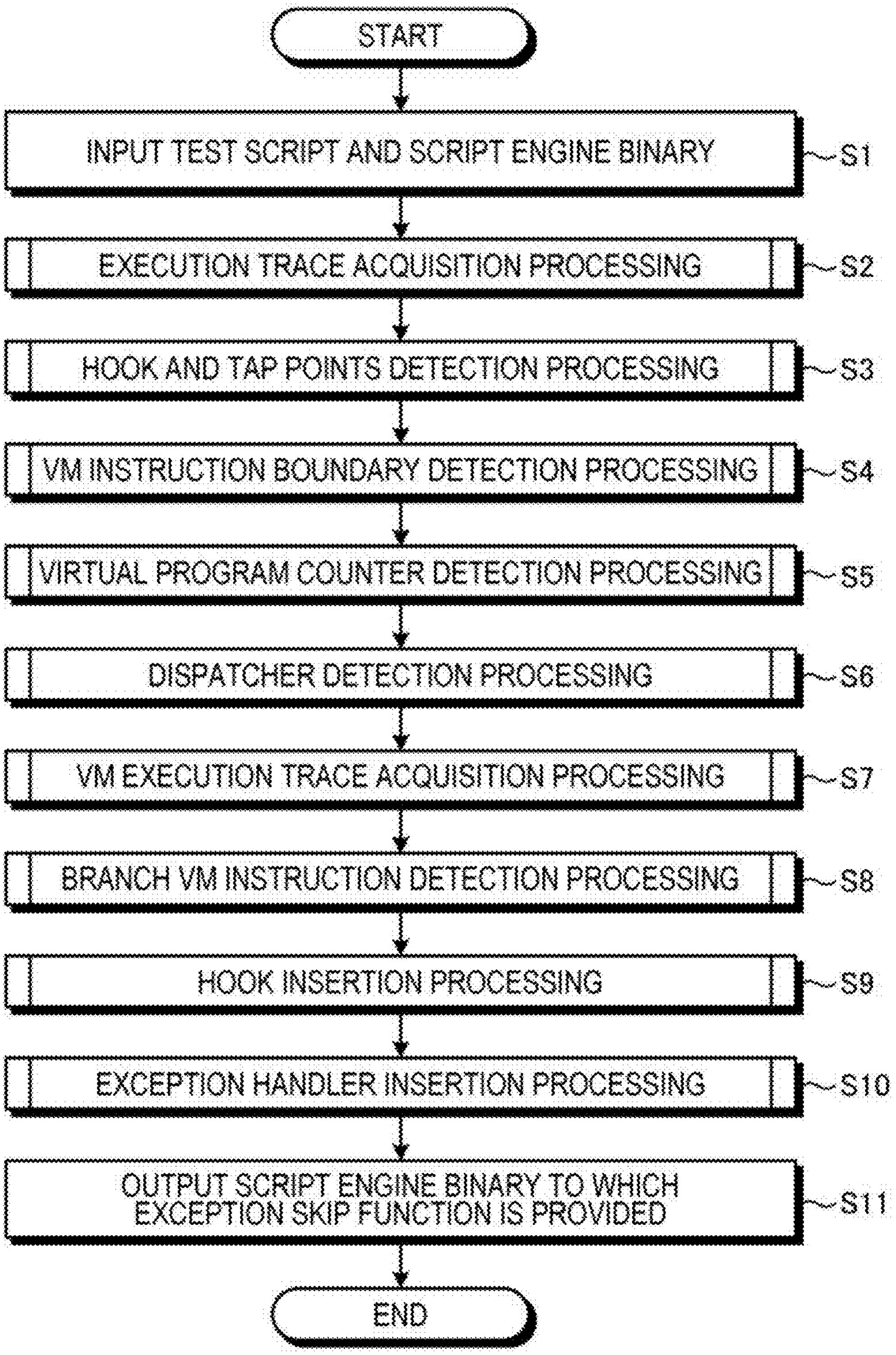
FIG. 15 is a flowchart illustrating a processing procedure of analysis function providing processing according to the embodiment.

[Processing Procedure of Analysis Function Providing Device] Next, a processing procedure of analysis function providing processing by the analysis function providing device 10 will be described. FIG. 15 is a flowchart illustrating a processing procedure of analysis function providing processing according to the embodiment.

First, the input unit 11 receives the test script and the script engine binary as inputs (step S1).

Then, the execution trace acquisition unit 1211 performs execution trace acquisition processing of executing the test script while monitoring the binary of the script engine to acquire the branch trace and the memory access trace (step S2).

The hook and tap points detection unit 1212 performs hook and tap points detection processing of analyzing the virtual machine on the basis of the execution trace acquired by the execution trace acquisition unit 1211 and detecting a hook point and a tap point (step S3).

The VM instruction boundary detection unit 1213 performs VM instruction boundary detection processing of detecting the VM instruction and detecting the boundary of the VM instruction (step S4). The virtual program counter detection unit 1214 performs virtual program counter detection processing of extracting and analyzing the execution trace for the first test script stored in the execution trace DB 131 and finding the VPC (step S5).

The dispatcher detection unit 1215 performs dispatcher detection processing of cutting out each VM instruction portion from the script engine binary and detecting a portion having high similarity between the VM instructions as the dispatcher (step S6).

The VM execution trace acquisition unit 1221 performs VM execution trace acquisition processing of receiving the test script and the script engine binary as inputs and executing the test script while monitoring execution of the script engine binary to acquire the VM execution trace (step S7). The branch VM instruction detection unit 1222 performs branch VM instruction detection processing of extracting and analyzing the VM execution trace stored in the VM execution trace DB 133 and detecting the branch VM instruction (step S8).

The hook insertion unit 1231 performs hook insertion processing of inserting a hook into the script engine on the basis of the architecture information acquired in the processing of steps S1 to S6 (step S9). Then, the exception handler insertion unit 1232 performs exception handler insertion processing of inserting an exception handler into a script to be analyzed and providing an exception handling function (step S10). Then, the output unit 14 outputs the script engine binary to which the exception skip function is provided (step S11).

Figure 16:
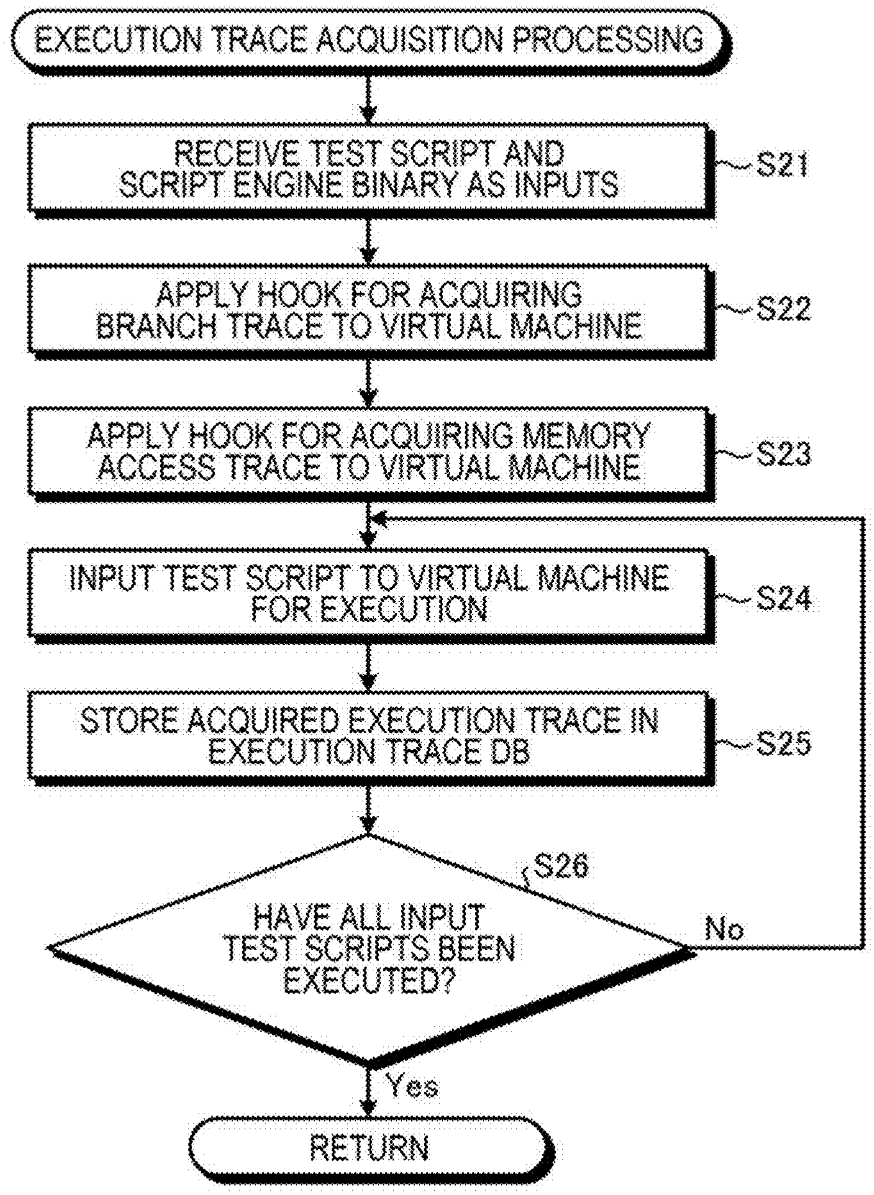
FIG. 16 is a flowchart illustrating a processing procedure of execution trace acquisition processing illustrated in FIG. 15.

[Processing Procedure of Execution Trace Acquisition Processing] Next, a flow of the execution trace acquisition processing illustrated in FIG. 15 will be described. FIG. 16 is a flowchart illustrating a processing procedure of the execution trace acquisition processing illustrated in FIG. 15.

First, the execution trace acquisition unit 1211 receives the test script and the script engine binary as inputs (step S21). Then, the execution trace acquisition unit 1211 applies a hook for acquiring the branch trace to the received script engine (step S22). In addition, the execution trace acquisition unit 1211 also applies a hook for acquiring the memory access trace to the received script engine (step S23).

Then, the execution trace acquisition unit 1211 inputs the test script received in that state to the script engine for execution (step S24), and stores the execution trace acquired by the execution in the execution trace DB 131 (step S25).

The execution trace acquisition unit 1211 determines whether or not all the input test scripts have been executed (step S26). In a case where all the input test scripts have been executed (step S26: Yes), the execution trace acquisition unit 1211 ends the processing. On the other hand, in a case where not all the input test scripts have been executed (step S26: No), the execution trace acquisition unit 1211 returns to the execution of the test script in step S24 and continues the processing.

Figure 17:
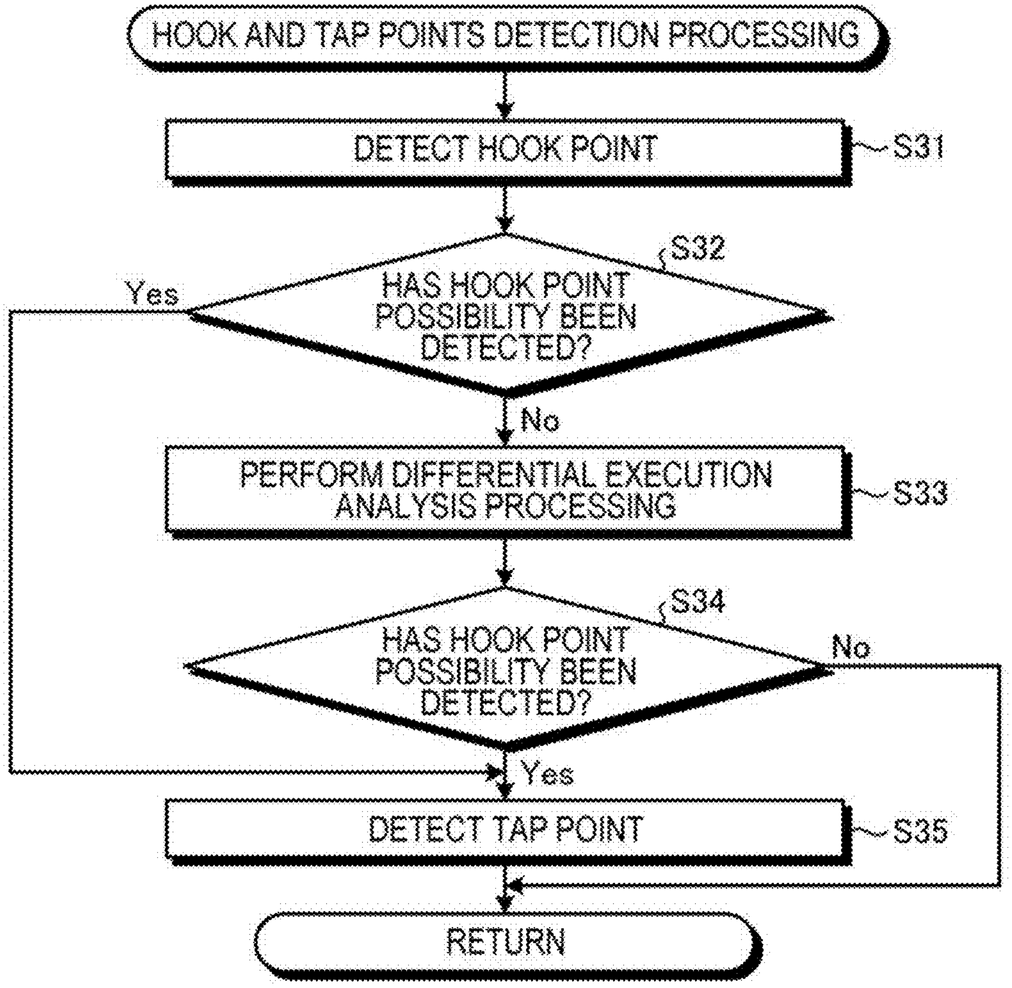
FIG. 17 is a flowchart illustrating a processing procedure of hook and tap points detection processing illustrated in FIG. 15.

[Processing Procedure of Hook and Tap Points Detection Processing] FIG. 17 is a flowchart illustrating a processing procedure of hook and tap points detection processing illustrated in FIG. 15.

As illustrated in FIG. 17, in the hook and tap points detection processing, the hook and tap points detection unit 1212 detects a hook point possibility (step S31). When a hook point possibility is detected (step S32: Yes), the hook and tap points detection unit 1212 proceeds to step S35. On the other hand, when no hook point possibility is detected (step S32: No), the hook and tap points detection unit 1212 performs differential execution analysis processing of detecting a hook point on the basis of a difference seen between execution traces in which a plurality of conditions is changed (step S33).

Then, when no hook point possibility is detected (step S34: No), the hook and tap points detection unit 1212 ends the processing since there is no hook point possibility. On the other hand, when a hook point possibility is detected (step S34: Yes), the hook and tap points detection unit 1212 proceeds to step S35. The hook and tap points detection unit 1212 detects a tap point (step S35).

Figure 18:
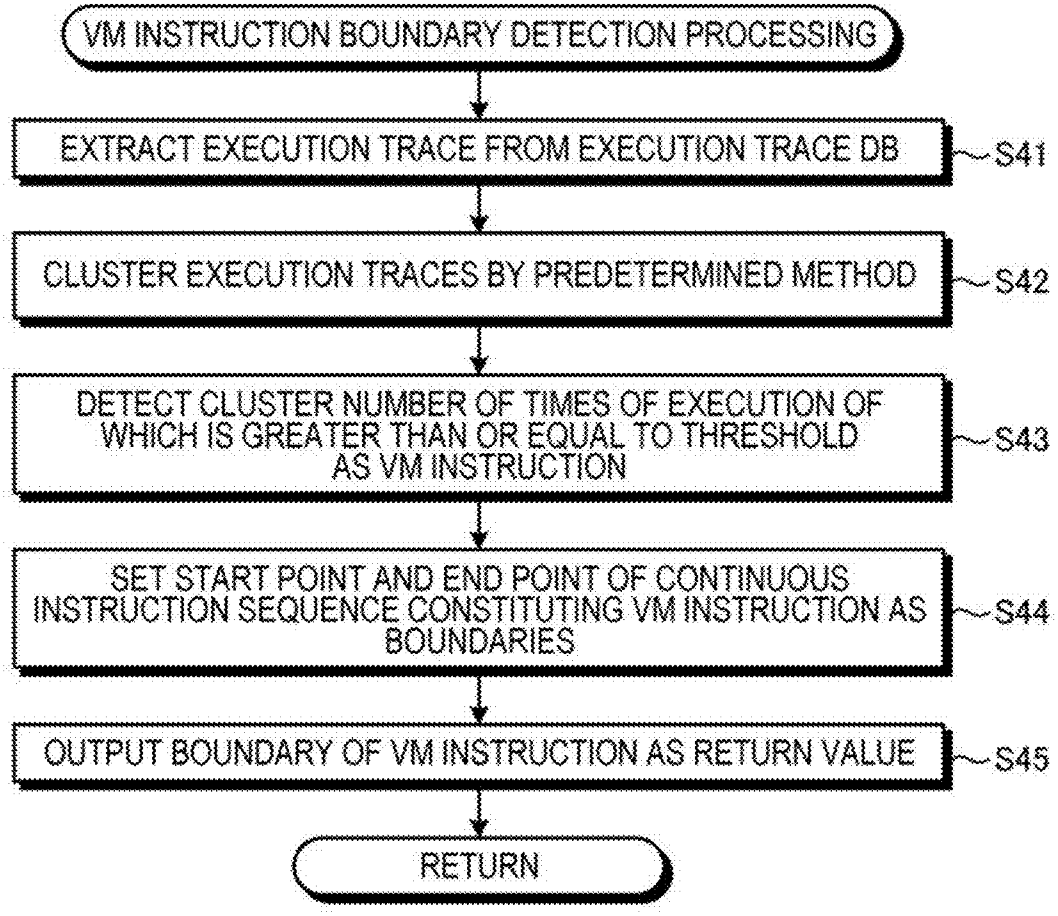
FIG. 18 is a flowchart illustrating a processing procedure of VM instruction boundary detection processing illustrated in FIG. 15.

[Processing Procedure of VM Instruction Boundary Detection Processing] Next, a flow of the VM instruction boundary detection processing illustrated in FIG. 15 will be described. FIG. 18 is a flowchart illustrating a processing procedure of the VM instruction boundary detection processing illustrated in FIG. 15.

First, the VM instruction boundary detection unit 1213 extracts the execution trace from the execution trace DB 131 (step S41). The VM instruction boundary detection unit 1213 clusters the execution traces by a predetermined method (step S42). Any method may be used for clustering.

The VM instruction boundary detection unit 1213 detects the cluster the number of times of execution of which is greater than or equal to the threshold as the VM instruction (step S43). Then, the VM instruction boundary detection unit 1213 sets the start point and the end point of the continuous instruction sequence constituting the VM instruction as boundaries (step S44). The VM instruction boundary detection unit 1213 outputs the boundary of the VM instruction as a return value (step S45), and ends the VM instruction boundary detection processing.

Figure 19:
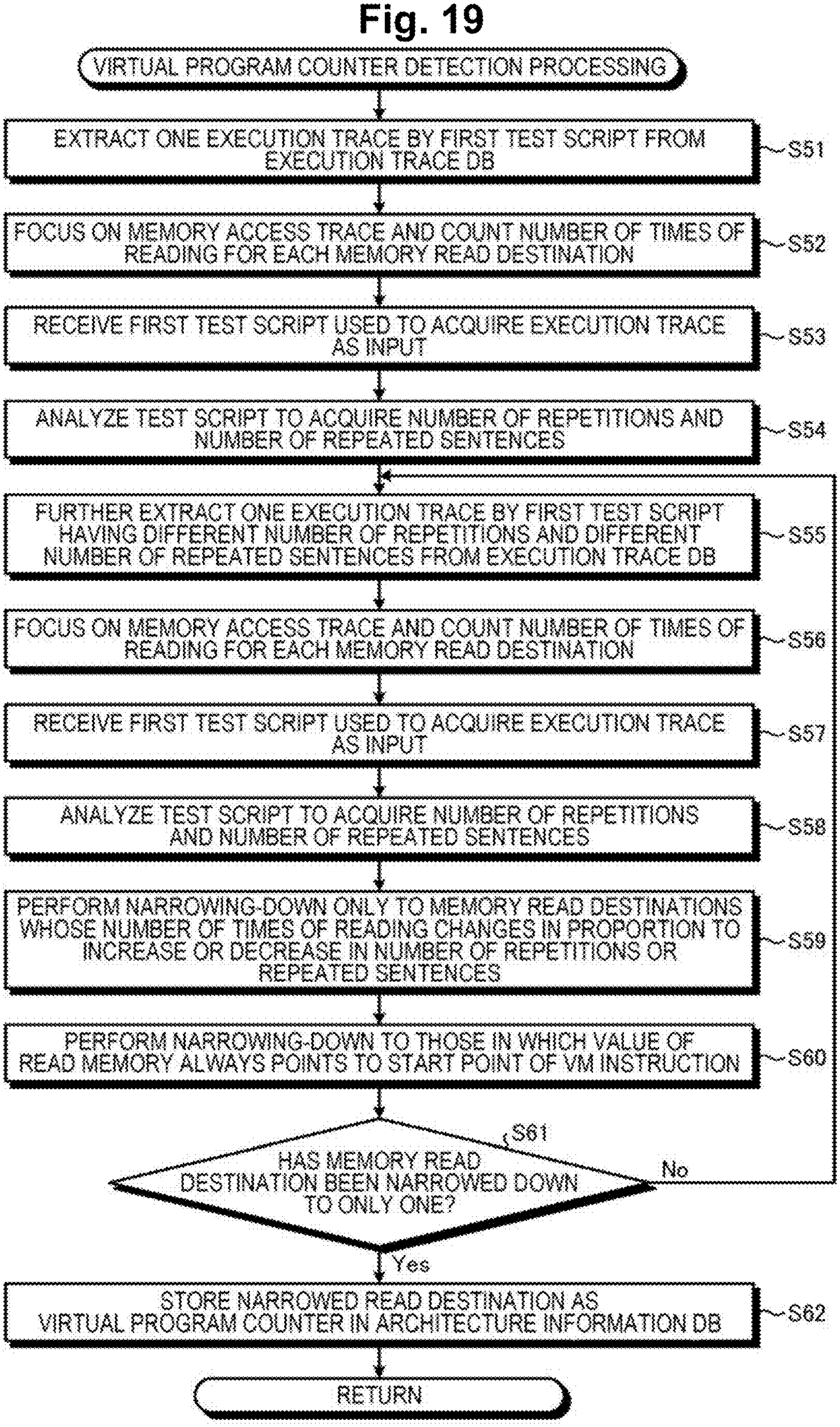
FIG. 19 is a flowchart illustrating a processing procedure of virtual program counter detection processing illustrated in FIG. 15.

[Processing Procedure of Virtual Program Counter Detection Processing] Next, a flow of the virtual program counter detection processing illustrated in FIG. 15 will be described. FIG. 19 is a flowchart illustrating a processing procedure of the virtual program counter detection processing illustrated in FIG. 15.

First, the virtual program counter detection unit 1214 extracts one execution trace by the first test script from the execution trace DB 131 (step S51). Subsequently, the virtual program counter detection unit 1214 focuses on the memory access trace in the execution trace and counts the number of times of reading for each memory read destination (step S52).

The virtual program counter detection unit 1214 receives the first test script used to acquire the execution trace as an input (step S53), and analyzes the first test script to acquire the number of repetitions and the number of repeated sentences (step S54).

Subsequently, the virtual program counter detection unit 1214 further extracts one execution trace by the first test script having a different number of repetitions and a different number of repeated sentences from the execution trace DB 131 (step S55). Then, the virtual program counter detection unit 1214 focuses on the memory access trace and counts the number of times of reading for each memory read destination (step S56). In addition, the virtual program counter detection unit 1214 receives the first test script used to acquire the execution trace as an input (step S57), analyzes the test script to acquire the number of repetitions and the number of repeated sentences (step S58).

Here, the virtual program counter detection unit 1214 performs narrowing-down only to memory read destinations whose number of times of reading changes in proportion to an increase or decrease in the number of repetitions or the repeated sentences (step S59). Further, the virtual program counter detection unit 1214 narrows down the memory read destinations narrowed down in step S59 to those in which the value of the read memory always points to the start point of the VM instruction (step S60).

Then, the virtual program counter detection unit 1214 determines whether or not the memory read destination has been narrowed down to only one (step S61). In a case where the memory read destination has not been narrowed down to only one (step S61: No), the virtual program counter detection unit 1214 returns to step S55, extracts one next execution trace, and continues the processing. On the other hand, in a case where the memory read destination has been narrowed down to only one (step S61: Yes), the virtual program counter detection unit 1214 stores the narrowed memory read destination as the virtual program counter in the architecture information DB 132 (step S62), and ends the processing.

Figure 20:
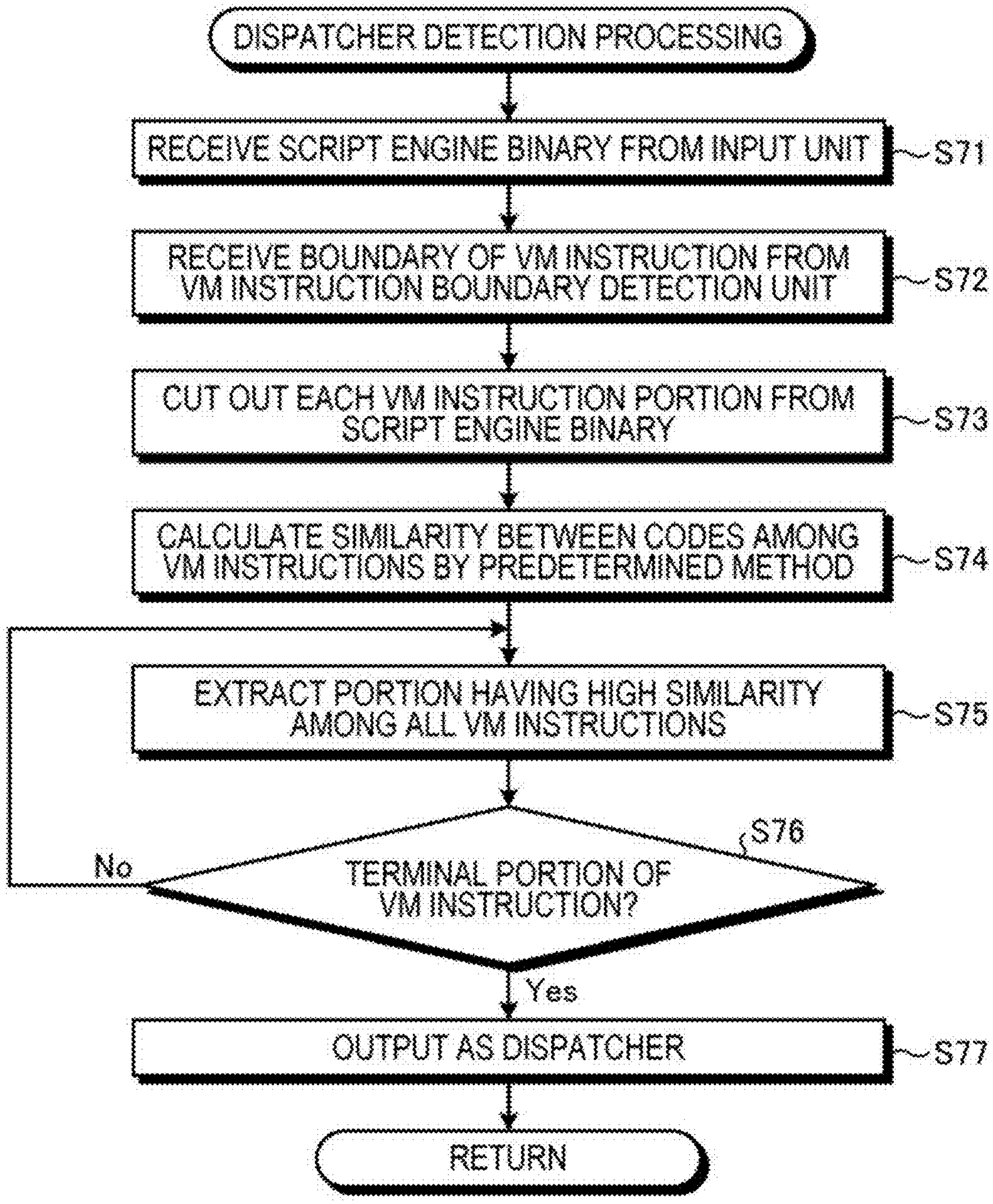
FIG. 20 is a diagram describing processing of a dispatcher detection unit.

[Processing Procedure of Dispatcher Detection Processing] Next, a flow of the dispatcher detection processing illustrated in FIG. 15 will be described. FIG. 20 is a flowchart illustrating a processing procedure of the dispatcher detection processing illustrated in FIG. 15. First, the dispatcher detection unit 1215 receives the script engine binary as an input (step S71). The dispatcher detection unit 1215 receives the boundary of the VM instruction from the VM instruction boundary detection unit 1213 (step S72).

The dispatcher detection unit 1215 cuts out each VM instruction portion from the script engine binary on the basis of the boundary of the VM instruction received from the VM instruction boundary detection unit 1213 (step S73). The dispatcher detection unit 1215 calculates the similarity between the codes among the VM instructions by a predetermined method (step S74). The similarity calculation method may be any method as long as the similarity between the codes can be calculated.

The dispatcher detection unit 1215 extracts a portion having high similarity among all the VM instructions on the basis of the similarity calculated in step S74 (step S75). Then, the dispatcher detection unit 1215 determines whether the extracted portion is a terminal portion of the VM instruction (step S76).

In a case where the extracted portion is not the terminal portion of the VM instruction (step S76: No), the dispatcher detection unit 1215 returns to step S75 and continues the processing. In addition, in a case where the extracted portion is the terminal portion of the VM instruction (step S76: Yes), the dispatcher detection unit 1215 outputs the extracted portion as the dispatcher (step S77), and ends the processing.

Figure 21:
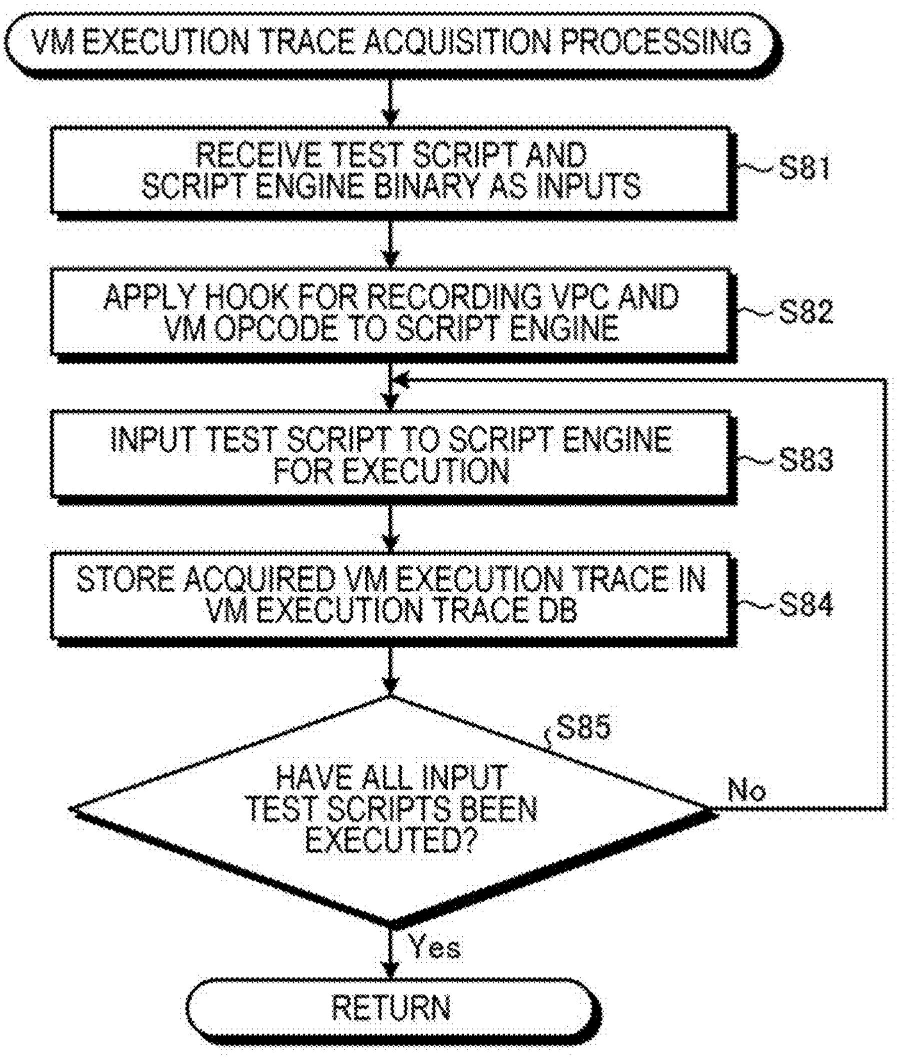
FIG. 21 is a flowchart illustrating a processing procedure of VM execution trace acquisition processing illustrated in FIG. 15.

[Processing Procedure of VM Execution Trace Acquisition Processing] Next, a flow of the VM execution trace acquisition processing illustrated in FIG. 15 will be described. FIG. 21 is a flowchart illustrating a processing procedure of VM execution trace acquisition processing illustrated in FIG. 15.

First, the VM execution trace acquisition unit 1221 receives the test script and the script engine binary as inputs (step S81). Then, the VM execution trace acquisition unit 1221 applies a hook for recording the VPC and the VM opcode to the received script engine (step S82).

The VM execution trace acquisition unit 1221 inputs the test script received in that state to the script engine for execution (step S83), and stores the VM execution trace acquired by the execution in the VM execution trace DB 133 (step S84).

The VM execution trace acquisition unit 1221 determines whether or not all the input test scripts have been executed (step S85). In a case where all the input test scripts have been executed (step S85: Yes), the VM execution trace acquisition unit 1221 ends the processing. In a case where not all the input test scripts have been executed (step S85: No), the VM execution trace acquisition unit 1221 returns to the execution of the test script in step S83 and continues the processing.

Figure 22:
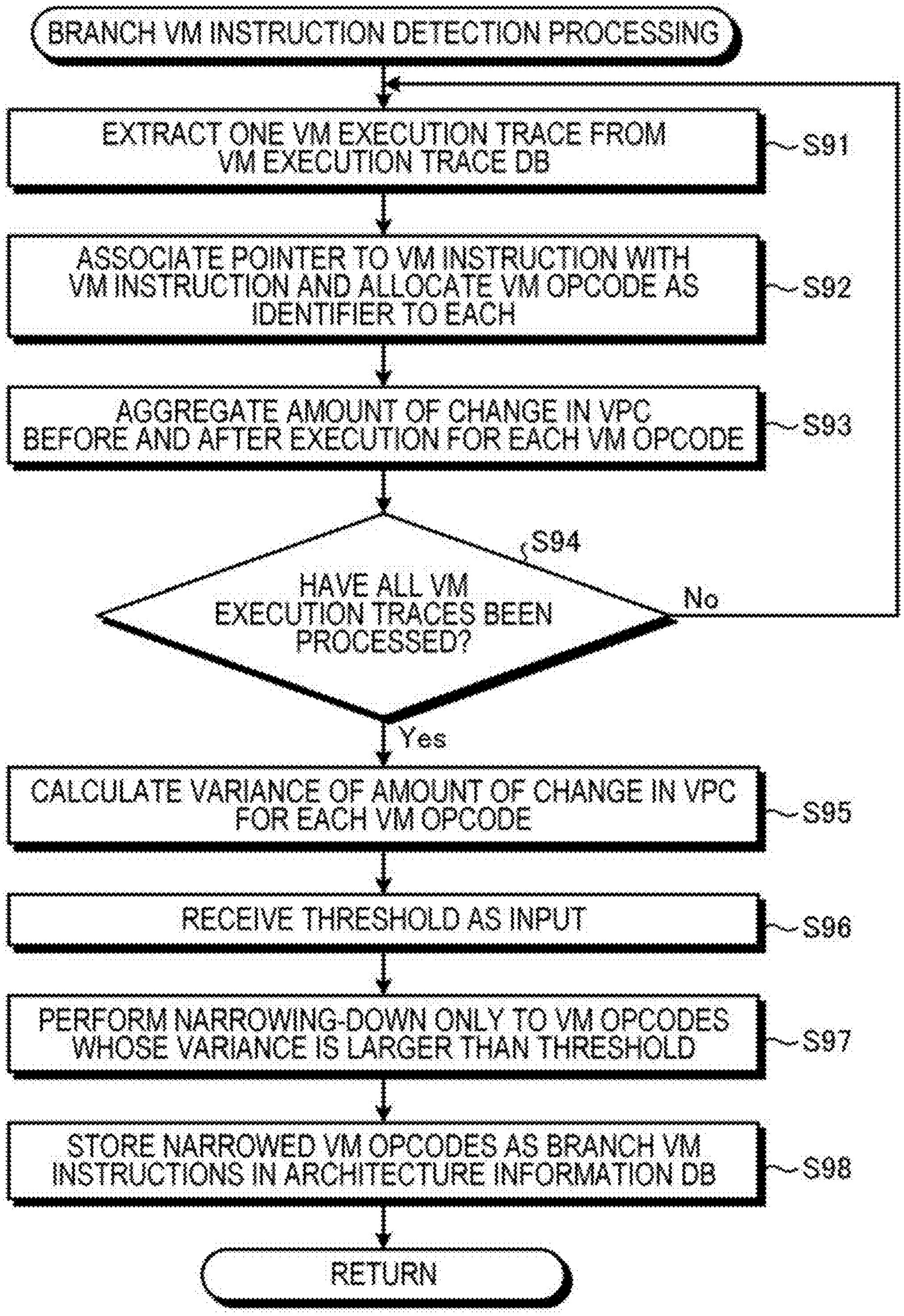
FIG. 22 is a flowchart illustrating a processing procedure of branch VM instruction detection processing illustrated in FIG. 15.

[Processing Procedure of Branch VM Instruction Detection Processing] Next, a flow of the branch VM instruction detection processing illustrated in FIG. 15 will be described. FIG. 22 is a flowchart illustrating a processing procedure of branch VM instruction detection processing illustrated in FIG. 15.

First, the branch VM instruction detection unit 1222 extracts one VM execution trace from the VM execution trace DB 133 (step S91). The branch VM instruction detection unit 1222 associates the pointer to the VM instruction with the VM instruction, and allocates the VM opcode as the identifier to each (step S92). Then, the branch VM instruction detection unit 1222 aggregates the amount of change in the VPC before and after execution for each VM opcode (step S93).

The branch VM instruction detection unit 1222 determines whether or not all the VM execution traces in the VM execution trace DB 133 have been processed (step S94). In a case where not all the VM execution traces of the VM execution trace DB 133 have been processed (step S94: No), the branch VM instruction detection unit 1222 returns to step S91 and extracts and processes one next VM execution trace.

In a case where all the VM execution traces of the VM execution trace DB 133 have been processed (step S94: Yes), the branch VM instruction detection unit 1222 calculates the variance of the amount of change in the VPC for each VM opcode (step S95). Then, the branch VM instruction detection unit 1222 receives the threshold as an input (step S96). The branch VM instruction detection unit 1222 performs narrowing-down only to VM opcodes whose variance is larger than the threshold (step S97), stores them as branch VM instructions in the architecture information DB 132 (step S98), and ends the processing.

Figure 23:
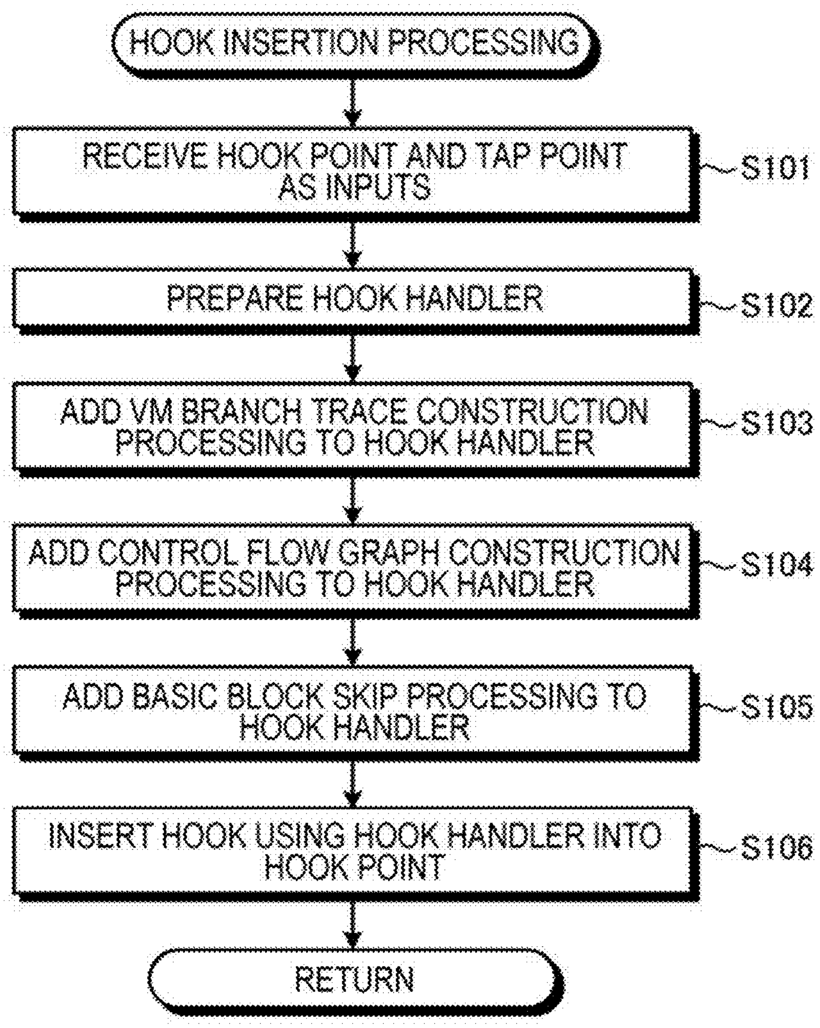
FIG. 23 is a flowchart illustrating a processing procedure of hook insertion processing illustrated in FIG. 15.

[Hook Insertion Processing] Next, a flow of hook insertion processing illustrated in FIG. 15 will be described. FIG. 23 is a flowchart illustrating a processing procedure of hook insertion processing illustrated in FIG. 15.

First, the hook insertion unit 1231 receives the hook point and the tap point detected by the hook and tap points detection unit 1212 as inputs (step S101), and prepares the hook handler (step S102).

The hook insertion unit 1231 adds the VM branch trace construction processing to the hook handler (step S103). The hook insertion unit 1231 adds the control flow graph construction processing to the hook handler (step S104). The hook insertion unit 1231 adds the basic block skip processing to the hook handler (step S105). The hook insertion unit 1231 inserts a hook using the hook handler into the hook point (step S106).

Figure 24:
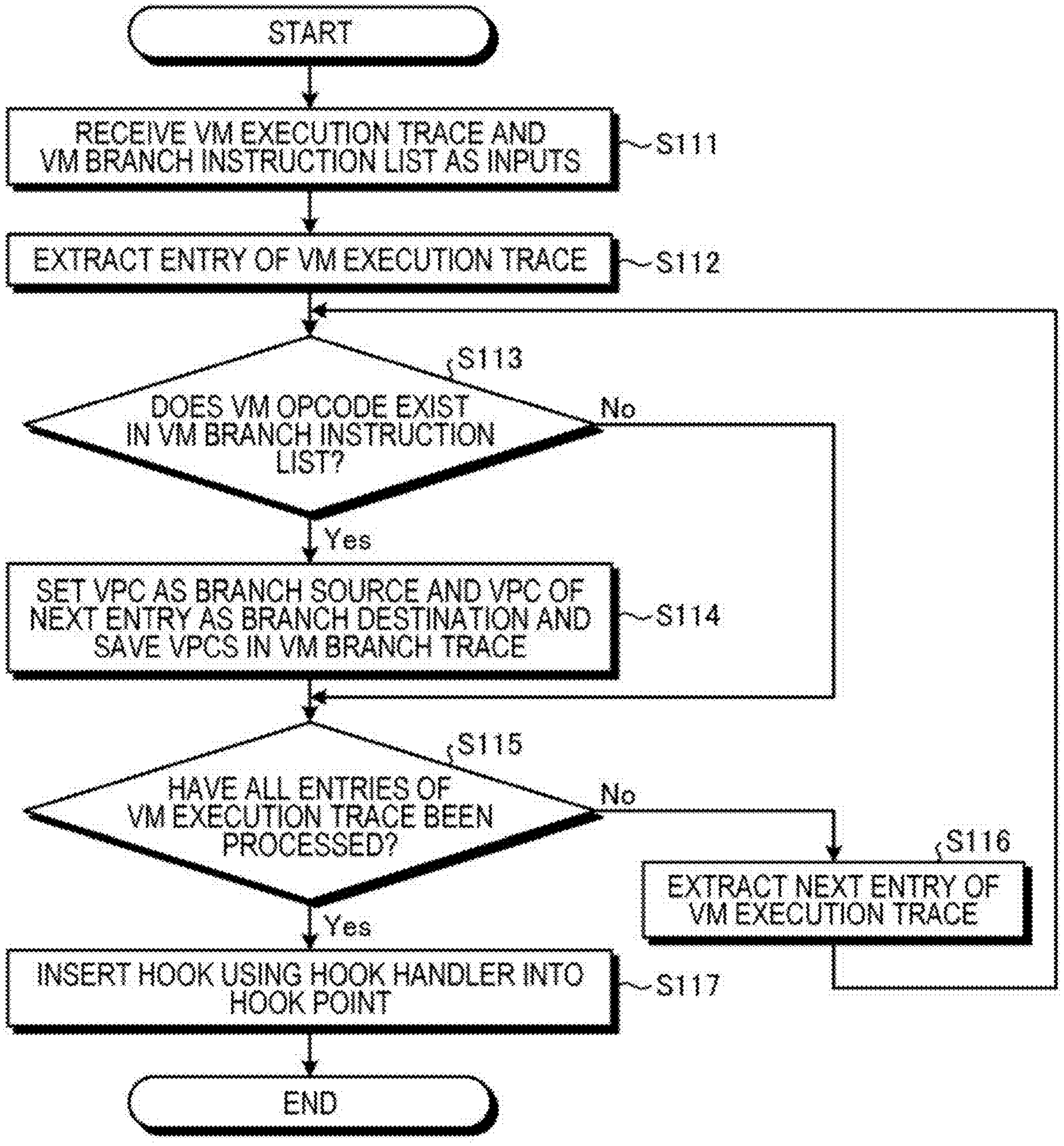
FIG. 24 is a flowchart illustrating a processing procedure of VM branch trace construction processing.

[VM Branch Trace Construction Processing] FIG. 24 is a flowchart illustrating a processing procedure of VM branch trace construction processing. In the VM branch trace construction processing, the VM execution trace and the VM branch instruction list are received as inputs (step S111).

In the VM branch trace construction processing, an entry of the VM execution trace is extracted (step S112). In the VM branch trace construction processing, it is determined whether the VM opcode exists in the VM branch instruction list (step S113).

In the VM branch trace construction processing, in a case where the VM opcode exists in the VM branch instruction list (step S113: Yes), the VPC is set as a branch source and the VPC of the next entry is set as a branch destination, and the VPCs are saved in the VM branch trace (step S114).

In the VM branch trace construction processing, in a case where the VM opcode does not exist in the VM branch instruction list (step S113: No), or after the end of step S114, it is determined whether or not all the entries of the VM execution trace have been processed (step S115).

In the VM branch trace construction processing, when not all the entries of the VM execution trace have been processed (step S115: No), the next entry of the VM execution trace is extracted (step S116). Then, in the VM branch trace construction processing, the processing returns to step S113, and it is determined whether the VM opcode exists in the VM branch instruction list for the next entry.

On the other hand, in the VM branch trace construction processing, when all the entries of the VM execution trace have been processed (step S115: Yes), a hook using the hook handler is inserted into the hook point (step S117).

Figure 25:
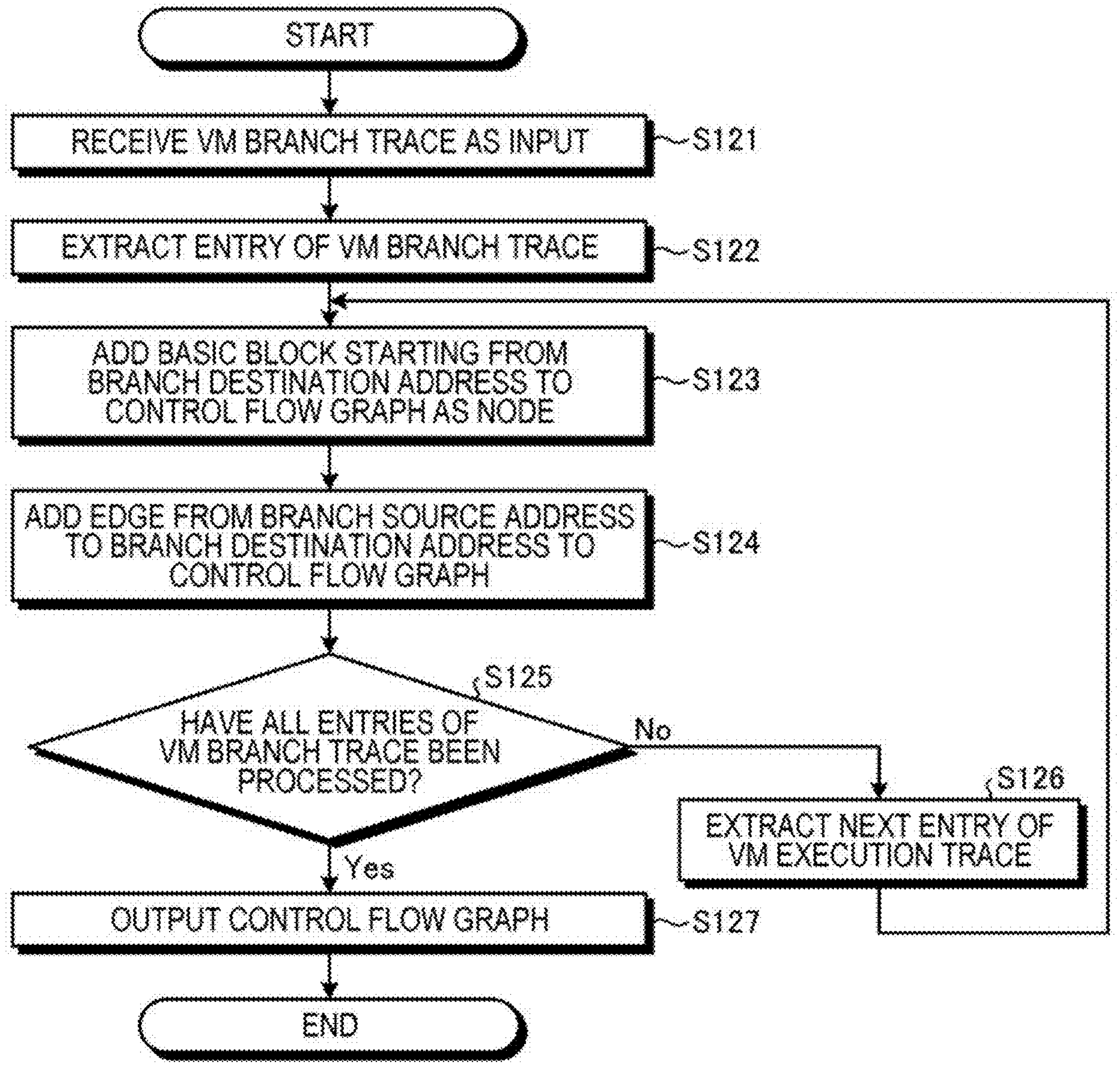
FIG. 25 is a flowchart illustrating a processing procedure of control flow graph construction processing.

[Control Flow Graph Construction Processing] FIG. 25 is a flowchart illustrating a processing procedure of control flow graph construction processing. In the control flow graph construction processing, when the VM branch trace is received as an input (step S121), an entry of the VM branch trace is extracted (step S122).

In the control flow graph construction processing, the basic block starting from the branch destination address is added to the control flow graph as a node (step S123). In the control flow graph construction processing, an edge from the branch source address to the branch destination address is added to the control flow graph (step S124). In the control flow graph construction processing, it is determined whether or not all the entries of the VM branch trace have been processed (step S125).

In the control flow graph construction processing, when not all the entries of the VM branch trace have been processed (step S125: No), the next entry of the VM execution trace is extracted (step S126). Then, the control flow graph construction processing return to step S123, and, for the next entry, adds the basic block starting from the branch destination address to the control flow graph as a node.

In the control flow graph construction processing, when all the entries of the VM branch trace have been processed (step S125: Yes), the constructed control flow graph is output (step S127).

Figure 26:
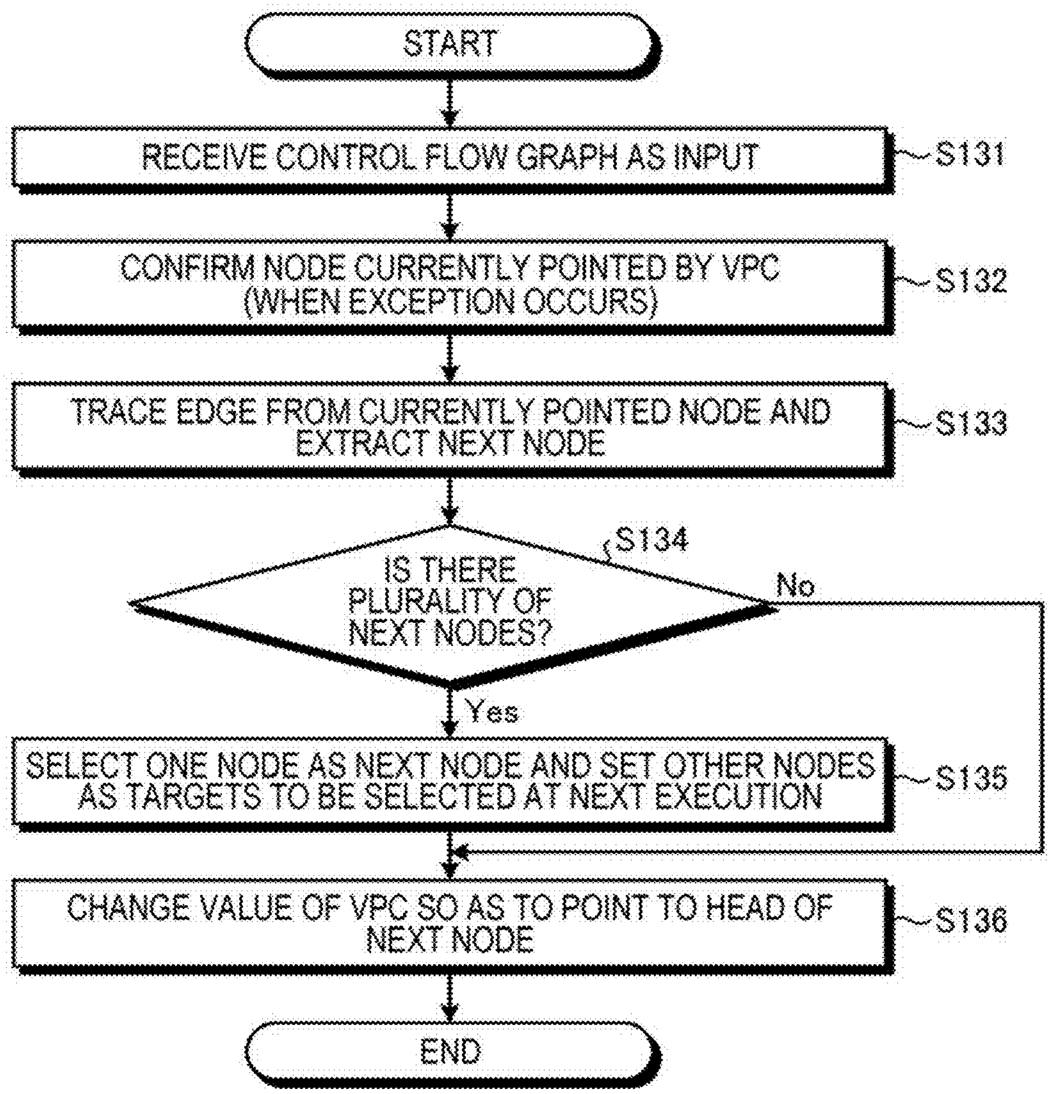
FIG. 26 is a flowchart illustrating a processing procedure of basic block skip processing.

[Basic Block Skip Processing] FIG. 26 is a flowchart illustrating a processing procedure of basic block skip processing. In the basic block skip processing, the control flow graph constructed in the control flow graph construction processing is received as an input (step S131).

In the basic block skip processing, a node currently pointed by the VPC (when an exception occurs) is confirmed (step S132). In the basic block skip processing, an edge is traced from a currently pointed node, and a next node is extracted (step S133).

In the basic block skip processing, it is determined whether there is a plurality of next nodes (step S134). In the basic block skip processing, when there is a plurality of next nodes (step S134: Yes), one node is selected as the next node, and the other nodes are set as targets to be selected at the next execution (step S135). The selection rule for the next node is set in advance.

In the basic block skip processing, when there is no plurality of next nodes (step S134: No), or after the processing in step S135 ends, the value of the VPC is changed so as to point to the head of the next node (step S136).

Figure 27:
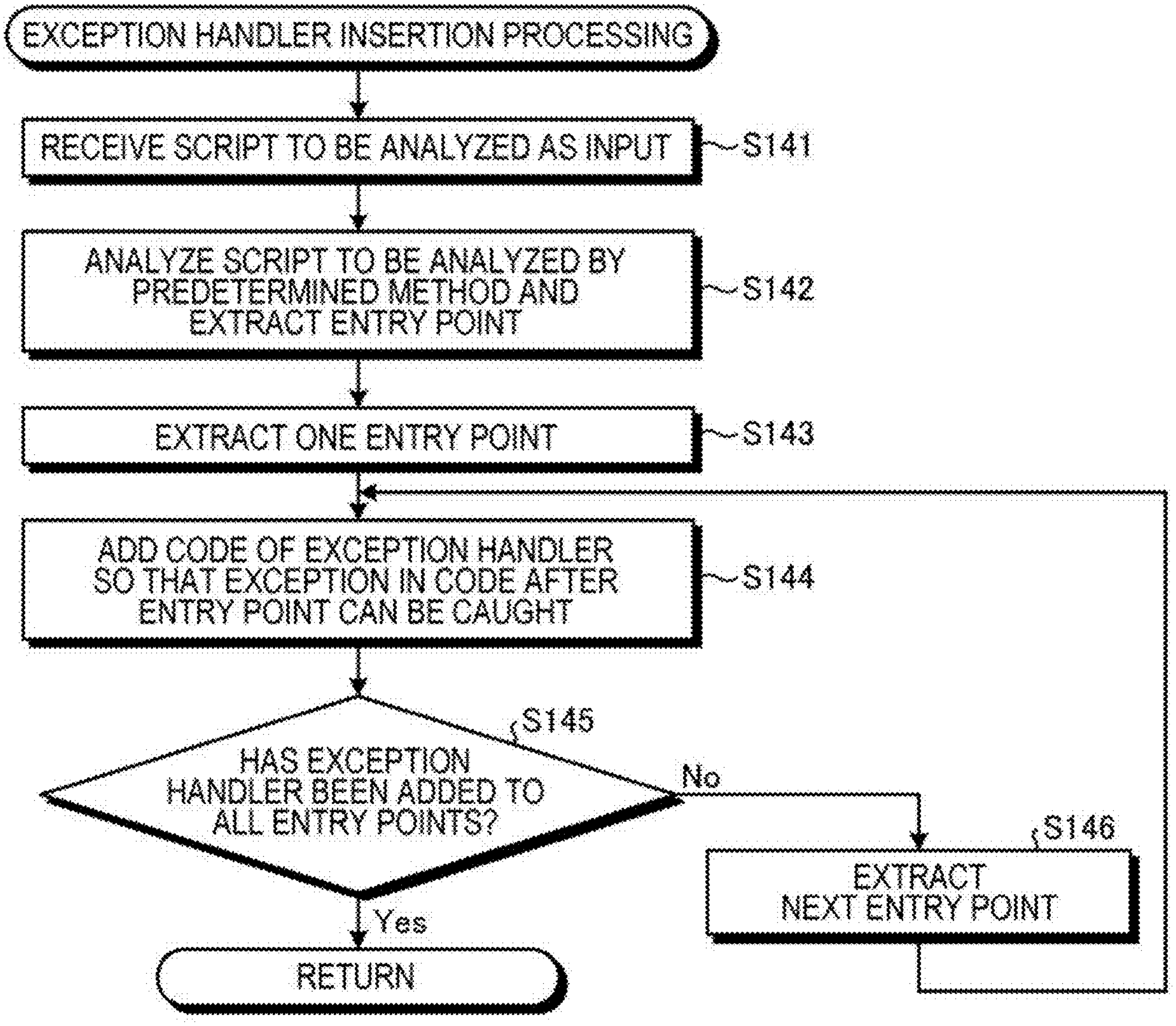
FIG. 27 is a flowchart illustrating a processing procedure of exception handler insertion processing illustrated in FIG. 15.

[Exception Handler Insertion Processing] A flow of exception handler insertion processing illustrated in FIG. 15 will be described. FIG. 27 is a flowchart illustrating a processing procedure of exception handler insertion processing illustrated in FIG. 15.

The exception handler insertion unit 1232 receives the script to be analyzed as an input (step S141). The exception handler insertion unit 1232 analyzes the script to be analyzed by a predetermined method and extracts an entry point (step S142).

The exception handler insertion unit 1232 extracts one entry point (step S143). The exception handler insertion unit 1232 adds the code of the exception handler (see, for example, FIG. 1) so that an exception in the code after the entry point can be caught (step S144).

The exception handler insertion unit 1232 determines whether or not an exception handler has been added to all entry points (step S145). When the exception handler has not been added to all the entry points (step S145: No), the exception handler insertion unit 1232 extracts the next entry point (step S146), proceeds to step S144, and adds the code of the exception handler.

When the exception handler is added to all the entry points (step S145: Yes), the exception handler insertion unit 1232 ends the processing.

[Effects of the Embodiment] As described above, the analysis function providing device 10 according to the embodiment executes the test script while monitoring the binary of the script engine to acquire the branch trace and the memory access trace as the execution trace. The analysis function providing device 10 analyzes the virtual machine on the basis of the execution trace, and acquires architecture information of the hook point, the tap point, the VPC, the VM instruction boundary, and the dispatcher. Further, the analysis function providing device 10 executes the test script to acquire the VM execution trace, analyzes the instruction set architecture by using the VM execution trace, and acquires the branch VM instruction as architecture information.

Then, the analysis function providing device 10 applies, to the hook point of the script engine, a hook including processing of changing the destination pointed by the VPC to the head of the basic block immediately after the basic block in which an exception has occurred when the exception has occurred on the basis of the obtained architecture information, and provides the analysis function including the exception handling function.

Specifically, the analysis function providing device 10 provides the exception handling function by inserting, to the script to be analyzed, an exception handler that forcibly transfers processing to the VM area when the occurrence of the exception is caught. The analysis function providing device 10 applies a hook using the hook handler including processing of changing the destination pointed by the VPC to the head of the basic block immediately after the basic block in which the exception has occurred in the VM area. As a result, the analysis function providing device 10 suppresses the stop of the execution due to the exception by skipping the basic block in which the exception has occurred.

As a result, the analysis function providing device 10 can detect various types of architecture information by analysis based on acquisition of the execution trace and the VM execution trace and can implement provision of the exception handling function without requiring manual reverse engineering even for a proprietary script engine for which only the binary can be obtained.

In addition, since the analysis function providing device 10 can automatically provide the exception handling function to various script engines only by preparing a test script, it is possible to provide the exception handling function without requiring individual design and implementation.

As described above, the analysis function providing device 10 is useful for analyzing the behavior of malicious scripts described in various script languages, and is suitable for analyzing the behavior of malicious scripts in which execution is stopped due to an exception during the analysis without being affected by the malicious script. For this reason, by providing various script engines with the exception handling function by using the analysis function providing device 10, even in a case where there is an exception, it is possible to analyze the behavior of the malicious script while suppressing the stop of execution due to the exception and utilize the analysis for countermeasures such as detection.

Note that the analysis function providing device 10 can similarly catch an exception in multipath execution by forcing the execution path and continue the analysis while preventing unintended stop of the execution.

Regarding System Configuration of the Embodiment

Each component of the analysis function providing device 10 illustrated in FIG. 3 is functionally conceptual, and does not necessarily need to be physically configured as illustrated. That is, specific forms of distribution and integration of the functions of the analysis function providing device 10 are not limited to the illustrated forms, and all or a part thereof can be functionally or physically distributed or integrated in any unit according to various loads, usage conditions, and the like.

In addition, all or any part of each of pieces of processing performed in the analysis function providing device 10 may be implemented by the CPU and a program analyzed and executed by the CPU. In addition, each of the pieces of processing performed in the analysis function providing device 10 may be implemented as hardware by wired logic.

In addition, among the pieces of processing described in the embodiment, all or part of the processing described as being automatically performed can be manually performed. Alternatively, all or part of the processing described as being manually performed can be automatically performed by a known method. In addition, the above-described and illustrated processing procedures, control procedures, specific names, and information including various data and parameters can be appropriately changed unless otherwise specified.

Figure 28:
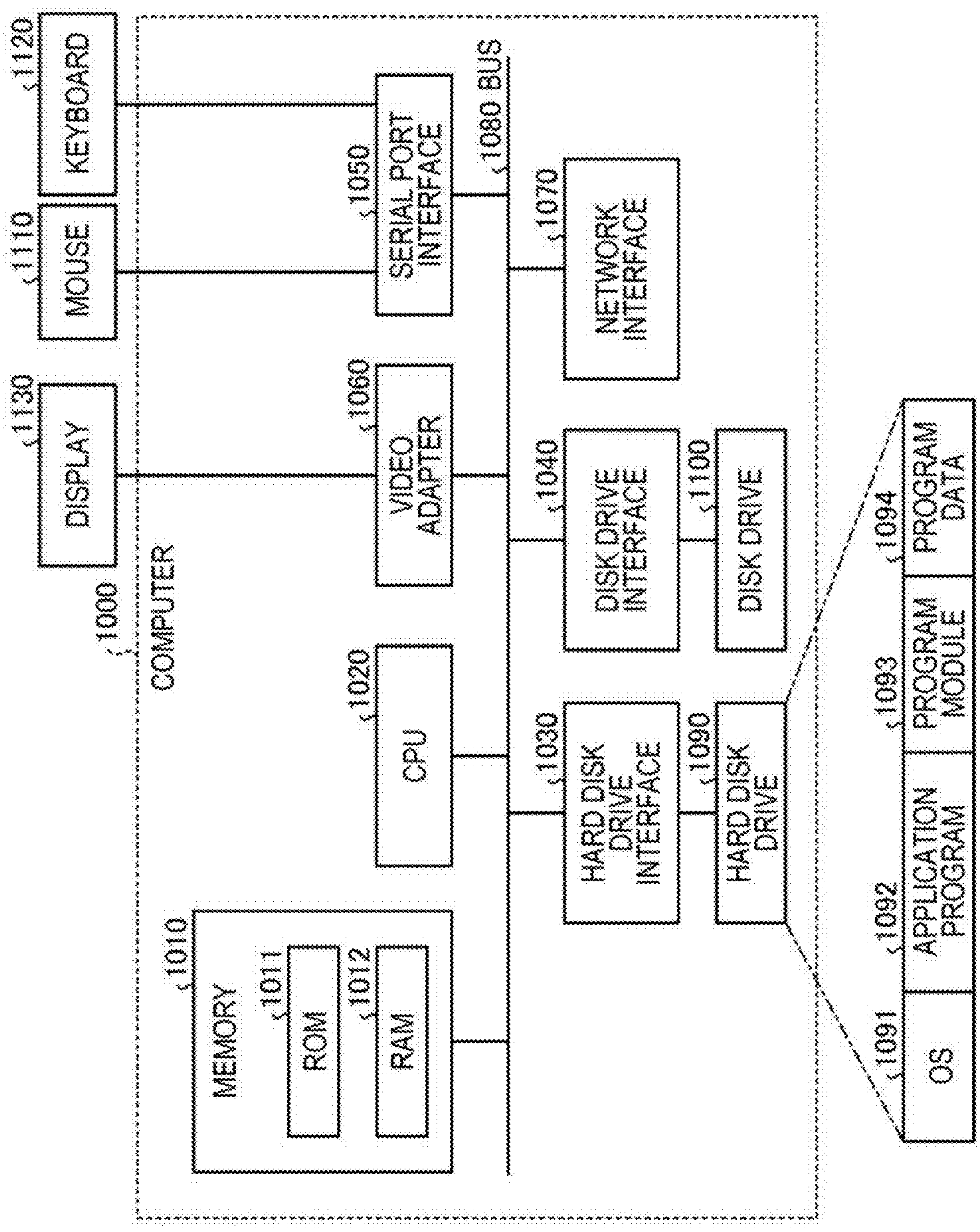
FIG. 28 is a diagram illustrating an example of a computer in which a program is executed and thus the analysis function providing device is implemented.

[Program] FIG. 28 is a diagram illustrating an example of a computer in which a program is executed and thus the analysis function providing device 10 is implemented. A computer 1000 includes a memory 1010 and a CPU 1020, for example. In addition, the computer 1000 also includes a hard disk drive interface 1030, a disk drive interface 1040, a serial port interface 1050, a video adapter 1060, and a network interface 1070. Those units are connected to each other by a bus 1080.

The memory 1010 includes ROM 1011 and RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to a mouse 1110 and a keyboard 1120, for example. The video adapter 1060 is connected to a display 1130, for example.

The hard disk drive 1090 stores an OS 1091, an application program 1092, a program module 1093, and program data 1094, for example. That is, the program that defines each of pieces of processing of the analysis function providing device 10 is implemented as the program module 1093 in which codes executable by the computer 1000 are described. The program module 1093 is stored in, for example, the hard disk drive 1090. For example, the program module 1093 for executing processing similar to the functional configurations in the analysis function providing device 10 is stored in the hard disk drive 1090. Note that the hard disk drive 1090 may be replaced with a solid state drive (SSD).

In addition, setting data used in the processing of the above-described embodiment is stored as the program data 1094, for example, in the memory 1010 or the hard disk drive 1090. Then, the CPU 1020 reads the program module 1093 and the program data 1094 stored in the memory 1010 or the hard disk drive 1090 into the RAM 1012 as necessary and executes the program module 1093 and the program data 1094.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from another computer via the network interface 1070.

Although the embodiment to which the invention made by the present inventors is applied has been described above, the present invention is not limited by the description and drawings constituting a part of the disclosure of the present invention according to the present embodiment. That is, other embodiments, examples, operation techniques, and the like made by those skilled in the art and the like based on the present embodiment are all included in the scope of the present invention.

REFERENCE SIGNS LIST

10 analysis function providing device
11 input unit
12 control unit
13 storage unit
14 output unit
121 virtual machine analysis unit
122 instruction set architecture analysis unit
123 function providing unit
131 execution trace database (DB)
132 architecture information DB
133 VM execution trace DB
1211 execution trace acquisition unit
1212 hook and tap points detection unit
1213 VM instruction boundary detection unit
1214 virtual program counter detection unit
1215 dispatcher detection unit
1221 VM execution trace acquisition unit
1222 branch VM instruction detection unit
1231 hook insertion unit
1232 exception handler insertion unit

The invention claimed is:

1. An analysis function providing method executed by an analysis function providing device, the analysis function providing method comprising:

first analyzing a virtual machine of a script engine, and acquiring a hook point that is a part where an analysis code is inserted by applying a hook, and a virtual program counter that is a variable indicating an instruction of the virtual machine to be executed next;

second analyzing an instruction set architecture that is a system of instructions of the virtual machine and acquiring a branch virtual machine instruction that is a virtual machine instruction that causes branch; and providing an analysis function by applying a hook, to the hook point of the script engine, the hook including processing of, when an exception has occurred, changing a destination pointed by the virtual program counter to a head of a basic block immediately after a basic block in which the exception has occurred on a basis of the virtual program counter and the branch virtual machine instruction that are architecture information obtained by analysis.

2. The analysis function providing method according to claim 1, wherein the providing includes:

first inserting, into a script to be analyzed, an exception handler having a function of transferring processing to a virtual machine area when occurrence of an exception is caught, and second inserting a hook into the hook point of the script engine by using a hook handler including processing of changing the destination pointed by the virtual program counter to the head of the basic block immediately after the basic block in which the exception has occurred in the virtual machine area.

3. The analysis function providing method according to claim 2, wherein the second analyzing includes:

first acquiring a virtual machine execution trace that is an execution trace executed in the virtual machine, the virtual machine execution trace recording a pointer of an executed virtual machine instruction handler in which a virtual machine opcode is virtually allocated as an identifier, and the virtual program counter, and first detecting the branch virtual machine instruction by a variation in an amount of change in a virtual program counter for each virtual machine opcode of the virtual machine execution trace, and the hook handler includes:

first processing of referring to a list of branch virtual machine instructions detected, detecting a branch virtual machine instruction from the virtual machine execution trace, and constructing a virtual machine branch trace associated with the virtual program counter before and after execution of the detected branch virtual machine instruction, second processing of constructing a control flow graph in which the basic block is a node and a branch of the virtual machine branch trace is an edge using the virtual machine branch trace, and third processing of, when the exception has occurred, determining which part of the control flow graph the exception corresponds to, and changing the destination pointed by the virtual program counter to the head of the basic block immediately after the basic block in which the exception has occurred.

4. The analysis function providing method according to claim 3, wherein the first analyzing includes:

acquiring a plurality of execution traces while changing a condition at a time of execution, analyzing the execution trace and detecting the hook point, clustering the execution traces to detect a boundary of each virtual machine instruction, analyzing the plurality of execution traces using differential execution analysis focusing on a number of times of reading a memory and a boundary of each virtual machine instruction detected and detecting the virtual program counter, and analyzing a binary of a script engine and detecting a dispatcher on a basis of a boundary of each virtual instruction detected.

5. The analysis function providing method according to claim 1, wherein the first analyzing and the second analyzing include performing analysis using a test script.

6. An analysis function providing device comprising:

processing circuitry configured to:

analyze a virtual machine of a script engine, and acquire a hook point that is a part where an analysis code is inserted by applying a hook, and a virtual program counter that is a variable indicating an instruction of the virtual machine to be executed next;

analyze an instruction set architecture that is a system of instructions of the virtual machine and acquire a branch virtual machine instruction that is a virtual machine instruction that causes branch; and provide an analysis function by applying a hook, to the hook point of the script engine, the hook including processing of, when an exception has occurred, changing a destination pointed by the virtual program counter to a head of a basic block immediately after a basic block in which the exception has occurred on a basis of the virtual program counter and the branch virtual machine instruction that are architecture information obtained by analysis.

7. A non-transitory computer-readable recording medium storing therein an analysis function providing program that causes a computer to execute a process comprising:

first analyzing a virtual machine of a script engine, and acquiring a hook point that is a part where an analysis code is inserted by applying a hook, and a virtual program counter that is a variable indicating an instruction of the virtual machine to be executed next;

second analyzing an instruction set architecture that is a system of instructions of the virtual machine and acquiring a branch virtual machine instruction that is a virtual machine instruction that causes branch; and providing an analysis function by applying a hook, to the hook point of the script engine, the hook including processing of, when an exception has occurred, changing a destination pointed by the virtual program counter to a head of a basic block immediately after a basic block in which the exception has occurred on a basis of the virtual program counter and the branch virtual machine instruction that are architecture information obtained by analysis.

* * * * *